(12) United States Patent
Karaca et al.

(10) Patent No.: US 7,261,053 B2
(45) Date of Patent: Aug. 28, 2007

(54) METHODS AND APPARATUS FOR AUTOMATIC JET INJECTION OF BIRD EGGS

(75) Inventors: Kemal Karaca, Athens, GA (US); David J. Hayzer, Atlanta, GA (US); Joseph H. Johnston, Jr., Gainesville, GA (US)

(73) Assignee: Merial Limited, Duluth, GA (US)

( * ) Notice: Subject to any disclaimer, the term of this patent is extended or adjusted under 35 U.S.C. 154(b) by 0 days.

(21) Appl. No.: 11/096,639

(22) Filed: Apr. 1, 2005

(65) Prior Publication Data
US 2005/0263079 A1 Dec. 1, 2005

Related U.S. Application Data

(60) Provisional application No. 60/624,970, filed on Nov. 4, 2004, provisional application No. 60/559,138, filed on Apr. 3, 2004.

(51) Int. Cl.
*A01K 45/00* (2006.01)
(52) U.S. Cl. ..................................................... 119/6.8
(58) Field of Classification Search ............... 119/6.8, 119/6.6
See application file for complete search history.

(56) References Cited

U.S. PATENT DOCUMENTS 2,851,006 A * 9/1958 Taylor et al. ............... 119/6.8
5,158,038 A * 10/1992 Sheeks et al. .............. 119/6.8
6,032,612 A * 3/2000 Williams ..................... 119/6.8
6,286,455 B1 * 9/2001 Williams ..................... 119/6.8
6,395,961 B1 * 5/2002 Petitte et al. ................. 800/21
6,601,534 B2 * 8/2003 Hebrank ..................... 119/6.8
2004/0040511 A1 * 3/2004 Williams ..................... 119/6.8
2006/0075973 A1 * 4/2006 Wolfe et al. ................ 119/6.8

OTHER PUBLICATIONS jet. Dictionary.com. Dictionary.com Unabridged (v 1.0.1). Random House, Inc. http://dictionary.reference.com/browse/jet.*

* cited by examiner

*Primary Examiner*—Kimberly S. Smith
(74) *Attorney, Agent, or Firm*—Judy Jarecki-Black; Merial Limited

(57) ABSTRACT

An in ovo jet injection apparatus and related methods for treating live eggs. The jet injection apparatus includes one or more jet injection delivery devices configured to deliver one or more treatment substances to predetermined areas of eggs using a high pressure stream of the treatment substance(s). Multiple treatment substances can be delivered so that they are spatially and/or temporally separate. The devices and methods of the invention enable the effective use of a plurality of treatment substances, including those that are effective when used alone but can be noxious if mixed. The methods and apparatus for the jet injection of substances into embryonic chicks reduce the risk of mechanical injury to the developing birds that would be caused by injection needles. The methods and apparatus of the invention can also reduce the introduction of an infection into the chicks.

28 Claims, 12 Drawing Sheets

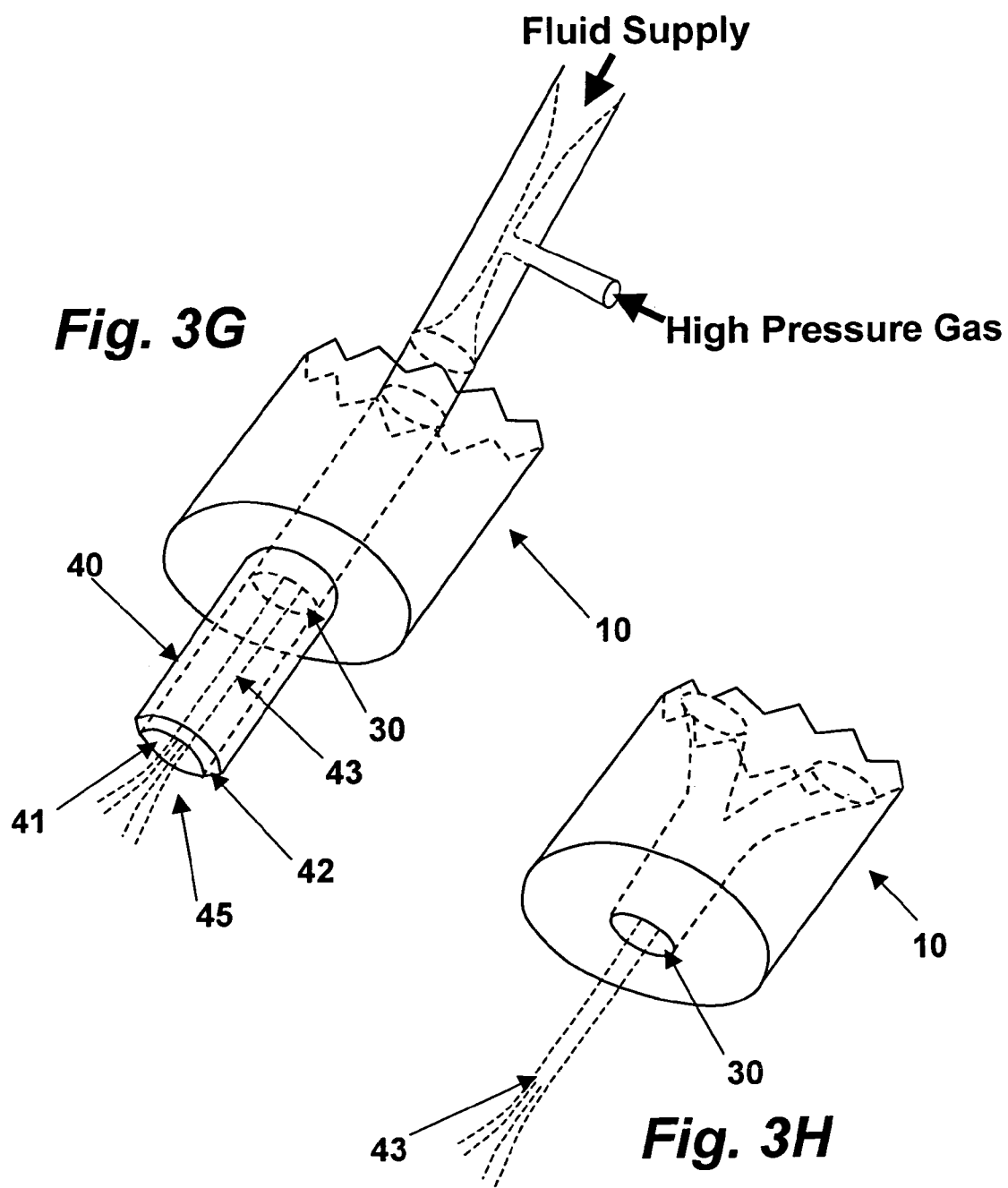

METHODS AND APPARATUS FOR AUTOMATIC JET INJECTION OF BIRD EGGS

CROSS-REFERENCE TO RELATED APPLICATIONS

This application claims priority to U.S. Provisional Patent Application Ser. No. 60/559,138, filed Apr. 3, 2004 and U.S. Provisional Patent Application Ser. No. 60/624,970, filed Nov. 4, 2004.

INCORPORATION BY REFERENCE

All documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

FIELD OF THE INVENTION

The present invention relates to treatment of avian embryos and, more particularly, relates to in ovo jet injection devices and methods for delivering various substances to live embryonated eggs.

BACKGROUND OF THE INVENTION

Injections of various substances into avian eggs have been employed to decrease post-hatch mortality rates, increase the potential growth rates or eventual size of the resulting chicken, and even to influence the gender determination of the embryo. Similarly, injections of antigens into live eggs have been employed to incubate various substances used in the production of vaccines that have human or animal medicinal or diagnostic applications. Examples of substances that have been proposed as viable treatment (or harvestable vaccine material) alternatives for delivery via in ovo injection of avian embryos include live culture vaccines, antibiotics, vitamins, and even competitive exclusion media (a live replicating organism). Specific examples of treatment substances are described in U.S. Pat. No. 4,458,630 to Sharma et al, and U.S. Pat. No. 5,028,421 to Fredericksen et al.

Conventionally, the physical injection has been typically targeted at preferred positions within the egg to administer the substance into specific developing regions of the embryo. As understood by those of skill in the art, as the incubation period progresses towards maturity and hatching, the embryo and its membranes, the air cell, the allantois, and yolk sac correspondingly change in volume and position within the egg shell. Additionally, the quantitative volume of the enclosed fluids can vary. For example, the density of the allantois varies over the incubation period. Thus, selection of the site and time of treatment can impact the effectiveness of the injected substance as well as the mortality rate of the treated embryos. See e.g., U.S. Pat. No. 4,458,630 to Sharma et al., U.S. Pat. No. 4,681,063 to Hebrank, and U.S. Pat. No. 5,158,038 to Sheeks et al.

Current injection methods that rely on substance delivery using a cannulated needle, however, present the risk of introducing infection into the target egg and/or injuring the injected embryo. There is still a need, therefore, for injection methods and apparatus that can deliver treatment substances to avian embryos but which do not, after piercing the outer hard shell, mechanically penetrate into the egg contents or the embryo. There is also a need for multisite injection methods and apparatus that will have a reduced likelihood of infecting the target egg due to mechanical penetration into the egg contents. There is a further need for automatic injection methods for treating multiple eggs simultaneously or in rapid and continuous succession without mechanically penetrating into the egg interior.

SUMMARY OF THE INVENTION

An in ovo jet injection apparatus and related methods for treating live eggs is disclosed. The jet injection apparatus includes one or more jet injection delivery devices which are configured to deliver one or more different substances into predetermined areas within the egg by means of narrow high pressure streams delivered from an injection head positioned outside the egg.

The devices and methods of the invention enable the effective use of a plurality of treatment substances that can be delivered so that they are spatially and/or temporally separate, including those that are effective when used alone but can be noxious if mixed.

The present invention recognizes that there is a need to introduce a treatment substance(s) into a live egg with a minimum of trauma thereto. The present invention therefore provides methods and apparatus for the injection of substances into embryonic chicks while significantly reducing the risk of mechanical injury to the developing birds that would otherwise be caused by using injection needles. By avoiding the use of injection needles as is well known in the art, the methods and apparatus of the present invention can substantially reduce the likelihood of introducing an infection into the chicks. The apparatus and methods can allow the delivery of individual treatment substances, including substances which are effective treatment alternatives when separately injected but become biologically noxious or unstable when combined. Thus, one object of the present invention is to provide an in ovo jet injection delivery device for delivering a variety of treatment substances to avian embryos while minimizing the risk of injury or infection thereto.

It is one object of the present invention to introduce, without mixing, biologically incompatible products in ovo to embryos.

It is a further object of the present invention to separately introduce without mixing at least two different treatment materials into different locations in the egg, through either a single or two separate delivery paths.

It is another object of the present invention to introduce at least two different treatment substances which are separately delivered by one or more of time and spatial separation into an opening in the egg shell.

A first aspect of the present invention, therefore, is a jet injection method for treating avian embryos in ovo. In the method, an avian egg is oriented into a predetermined position and a small opening is introduced into the shell of the avian egg. A jet injection delivery device is then positioned relative to the opening in the hard shell such that a high pressure stream of a treatment substance can be directed to a desired region of the interior of the egg and hence to the contents therein.

Another aspect of the present invention includes a jet injection method for treating avian embryos in ovo that first orients an avian egg into a predetermined position and then introduces a small first opening into the shell of an avian egg. Additionally, a small second opening is introduced into the shell of the avian egg, the second opening being spaced apart from the first opening. Respective ones of the first and second jet injection delivery devices are positioned over corresponding first and second openings such that high pressure streams of treatment substance(s) can be directed to desired regions of the interior of the egg and hence to the contents therein. Predetermined dosages of a first substance and a second substance are released from respective ones of the first and second jet injection delivery devices into the egg. The delivery devices are then retracted from the egg, thereby treating the avian embryo.

Yet another aspect of the present invention includes a multi-injection method for treating avian embryos in ovo which orients an avian egg into a predetermined position and introduces a small opening into the shell of an avian egg. A delivery device is positioned over the opening such that high pressure streams of treatment substance(s) can be directed to desired regions of the interior of the egg, and hence to the contents therein. Predetermined dosages of a first substance and a second substance are released into the egg and the delivery device is retracted from the egg, thereby treating the avian embryo. Advantageously, this method temporally combines the different substances to minimize degradation of the substances attributed to their interaction. Thus, preferably, this method allows the first and second substances to be stored in separate chambers and temporally combines or mixes the first and second substances, either with an active mixing chamber, or by introducing them into a common delivery high pressure stream, prior to delivery into the egg.

An additional aspect of the present invention is directed towards an automated in ovo jet injection apparatus for the rapid simultaneous or sequential treatment of a plurality of eggs. The apparatus comprises a fixture for holding a plurality of eggs in a substantially upright and aligned position. The fixture is configured to provide external access to predetermined areas of the eggs. The apparatus also includes a plurality of jet injection delivery devices configured to contact predetermined areas of the eggs; at least one of the injection devices corresponding to each egg in the fixture.

Preferably, the apparatus of the invention includes a means of penetrating the eggshell to create an opening in the shell. The opening will have a diameter sufficient to allow the high-pressure jet that is delivered from the exit orifice of the jet injection delivery device to be directed into the interior of the egg without obstruction. The apparatus further comprises a first treatment substance container for holding a first treatment substance. The first container is in fluid communication with each of the plurality of jet injection delivery devices. The apparatus may also include a second treatment substance container for holding a second treatment substance. The second container is also in fluid communication with each of the plurality of jet injection devices. The first container and each of the plurality of jet injection devices define a first fluid pathway therebetween. Similarly, the second container and each of the plurality of jet injection delivery devices define a second fluid pathway therebetween. A pump may be operably associated with the first and second containers and the jet injection units for delivering predetermined dosages of each of the first and second treatment substances to the injection devices.

In one embodiment of this aspect of the invention, the apparatus may comprise one jet injection delivery head that can move relative to the fixture holding the eggs, such that the injection head will treat one egg after another. In another embodiment, there is a plurality of injection heads such that a plurality if eggs, such as a row of arranged eggs can be treated in a single operation. A means of piercing the egg shells may also be provided as a single unit that will precede the injection head or plurality of heads as the injection heads advance from egg to egg. In one embodiment, each jet injection head is associated with a shell piercing means.

Another aspect of the present invention is also directed to an automated in ovo injection apparatus. The apparatus comprises a fixture for holding a plurality of eggs in an aligned position, such that the fixture is configured to provide external access to predetermined areas of the eggs. The apparatus includes a plurality of first jet injection delivery devices and a plurality of second jet injection delivery devices, each configured to contact predetermined areas of the egg, a respective one of each of the first and second injection delivery devices corresponding to one egg in the fixture. The device also includes first and second treatment substance containers for holding respective ones of first and second treatment substances. Preferably, the apparatus will include a means of penetrating the eggshell to create an opening in the shell. The opening in a hard egg shell will have a diameter sufficient to allow the high-pressure jet stream that is delivered from the exit orifice of the jet injection delivery device(s) to be directed into the interior of the egg without obstruction. The first container is in fluid communication with each of the first jet injection delivery devices and the second container is in fluid communication with each of the second jet injection delivery devices. Thus, the first container and each of the first delivery devices define a first fluid pathway therebetween and the second container and each of the second injection delivery devices define a second fluid pathway therebetween such that the first pathway is separate from the second pathway. A pump(s) may be operably associated with the first and second containers for delivering a predetermined dosage of each of the first and second treatment substances to each of the respective first and second injection devices. Similar to the apparatus above, this device can be alternatively configured to deliver different treatment substances to different treatment sites within the egg.

Eggs treated by the methods and apparatus of the present invention are preferably incubated to hatch after the treatment substances are administered. Most preferably, the treated eggs are resealed immediately after treatment to prevent infection of the embryos.

The foregoing and other objects and aspects of the present invention are explained in detail in the specification set forth below.

BRIEF DESCRIPTION OF THE DRAWINGS

FIG. 3G illustrates a jet injection head comprising a venturi for drawing a liquid treatment substance into a high pressure gas stream.

FIG. 3H illustrates a jet injection head comprising two lumens and a single orifice.

DETAILED DESCRIPTION OF THE PREFERRED EMBODIMENTS

The present invention is practiced with eggs, particularly bird or avian eggs such as chicken, turkey, duck, geese, quail, pheasant, or ostrich eggs. The eggs are viable eggs; that is, eggs containing a live avian embryo. The eggs may be in any stage of embryonic development, including both early embryonic development and late embryonic development.

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete and will fully convey the scope of the invention to those skilled in the art. In the drawings, like numbers refer to like elements throughout.

The present invention provides apparatus for the jet injection delivery of treatment substances to the contents of an egg. Having pierced the hard shell of an avian egg, the treatment substance is delivered as a narrow, high pressure stream that is capable of penetrating the membranes and tissues of the embryo and its associated tissues. The use of a high pressure liquid stream avoids the use of injection needles that can cause mechanical harm to the developing embryo, sometimes with fatal results. Because of the physical contact of needles with egg contents, there is also the possibility of cross contamination of a batch of eggs. Jet injection avoids mechanical transfer of infectious material between targeted eggs.

The jet injection apparatus 1 of the present invention can employ a single jet injection delivery device 10 (FIG. 1) or multiple (FIG. 2) jet injection delivery devices 10 to deliver one or more treatment substances into targeted eggs. As such, the apparatus is preferably configured to automatically introduce (in one or more of a spatially and temporally separated sequences) one or a multiple of treatment substances into a live egg 20 with a minimum of trauma thereto, and most preferably into a plurality of eggs. Advantageously, this apparatus can also deliver substances that are effective treatment alternatives when separately injected but which become less effective or biologically noxious when combined.

For the methods and apparatus of the present invention it is necessary that the hard shell of a targeted avian egg be opened, or pierced, to allow a jet injection delivery device 10 to deliver a an unimpeded high pressure stream 43 of a treatment substance from an orifice 30 directly into the interior of the egg 20, but without the jet injection delivery device 10 itself entering into the interior of the egg. It is contemplated, therefore, that the methods and the apparatus will employ a means 40 of penetrating a hard egg shell. A selected egg shell penetration means 40 can be an integral component of the jet injection delivery device 10 or, alternatively, a separate unit that will make a hole in the egg shell before a jet injection delivery device 10 is positioned to deliver a high pressure stream of a treatment substance to the interior of the egg. The egg penetration means 40 may be any device and method that can penetrate the hard egg shell, preferably without causing significant cracking of the shell surrounding a hole. Most preferably, the penetration means 40 will generate a circular opening. A preferred opening in the shell, however, is of sufficient area and dimensions that a high pressure stream 43 of jet injected treatment substance can enter the egg through the opening without being obstructed, which would otherwise decrease the intended administered dose or divert the stream from its intended path and target area of treatment.

A variety of egg shell penetration means 40 can be usefully incorporated into the apparatus of the including, but not limited to, a rotatable drill bit, a rotatable grinding bit, a rotatable saw, a piercing punch and a high pressure gas or fluid abrasive stream or a combination thereof. For example, one embodiment of the penetration means 40 is a tubular punch having a lumen 41 defined by the interior wall 48 of the punch and which may be positioned at the delivery end of a jet injection delivery device 10 as shown in FIG. 3A. The internal diameter of the lumen 41 may be the same or greater (as shown for example in FIG. 3A) than the diameter of the orifice 30 from which the high pressure jet stream 43 exits the delivery device 10. A high pressure treatment substance stream 43 can be ejected through an exit an orifice 30 of the jet injection delivery device 10 and pass in the direction of the longitudinal axis of the lumen 41 but without touching the interior wall 48 thereof, and hence into a target egg, as shown in FIGS. 3A and 3B. The distal end 45 of the tubular punch 40 may be configured as a bevel 42 having a sharpened edge 47 to ease penetration of the shell. The egg shell will be penetrated by contacting the egg shell with the distal end 45 of the punch 40. A reciprocal motion of the jet injection delivery device relative to the egg will drive the punch 40 through the eggshell. Since penetration of the shell by this means might drive fragments of the shell into the interior of the egg, the outer surface of the shell may be disinfected before piercing to prevent or reduce the possibility of introducing infectious material to the developing chick embryo.

In one embodiment of the invention, a punch 40 may be operably attached to a spring that will force the punch to enter through the shell while the jet injection delivery device is at a constant distance from the shell surface. In another embodiment, the punch 40 may be operably connected to a hydraulic ram 50 to drive the punch 40 through the shell and retract the punch for reuse with another egg.

Figure 1:
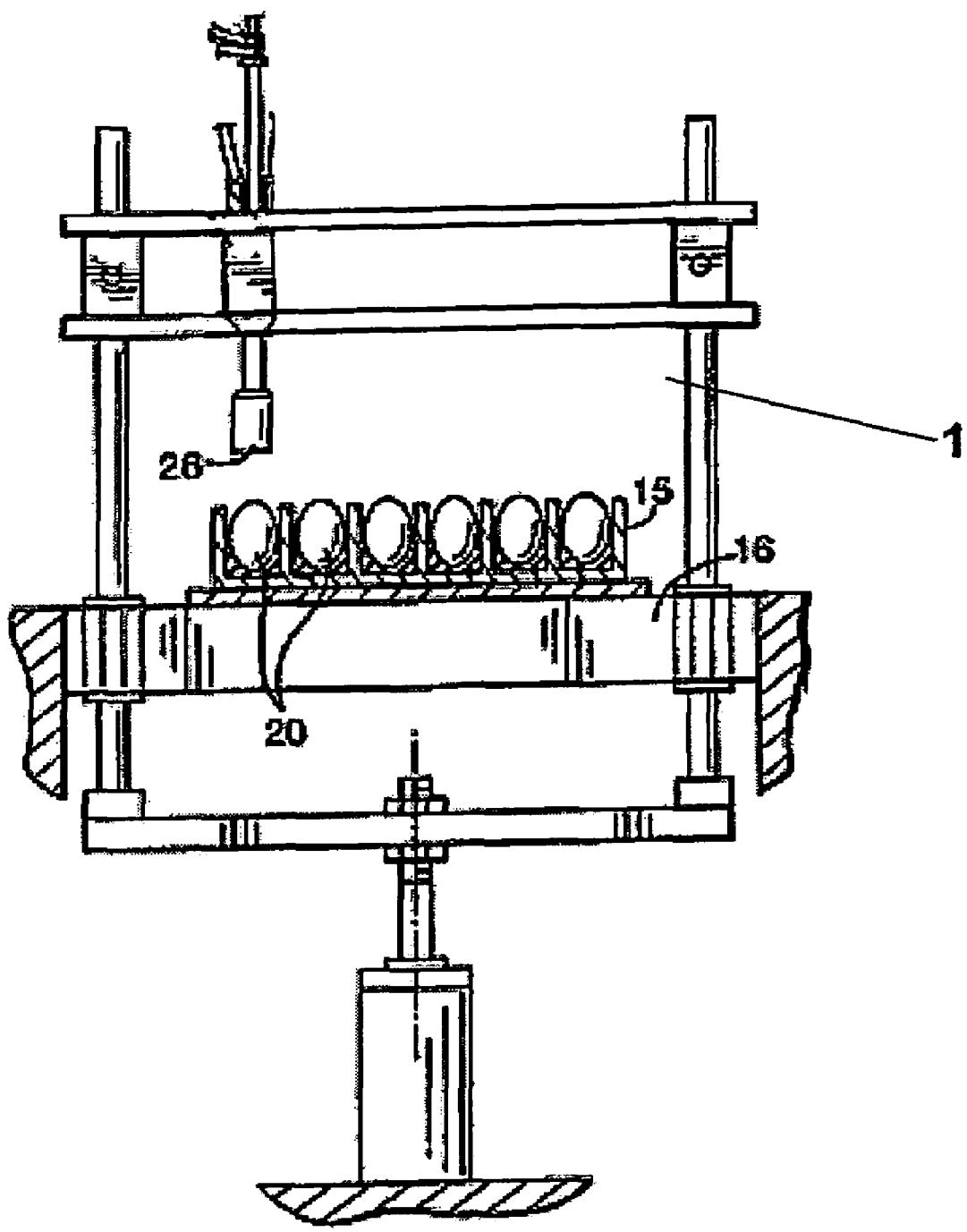
FIG. 1 illustrates a single jet injection delivery device according to the invention.
Figure 2:
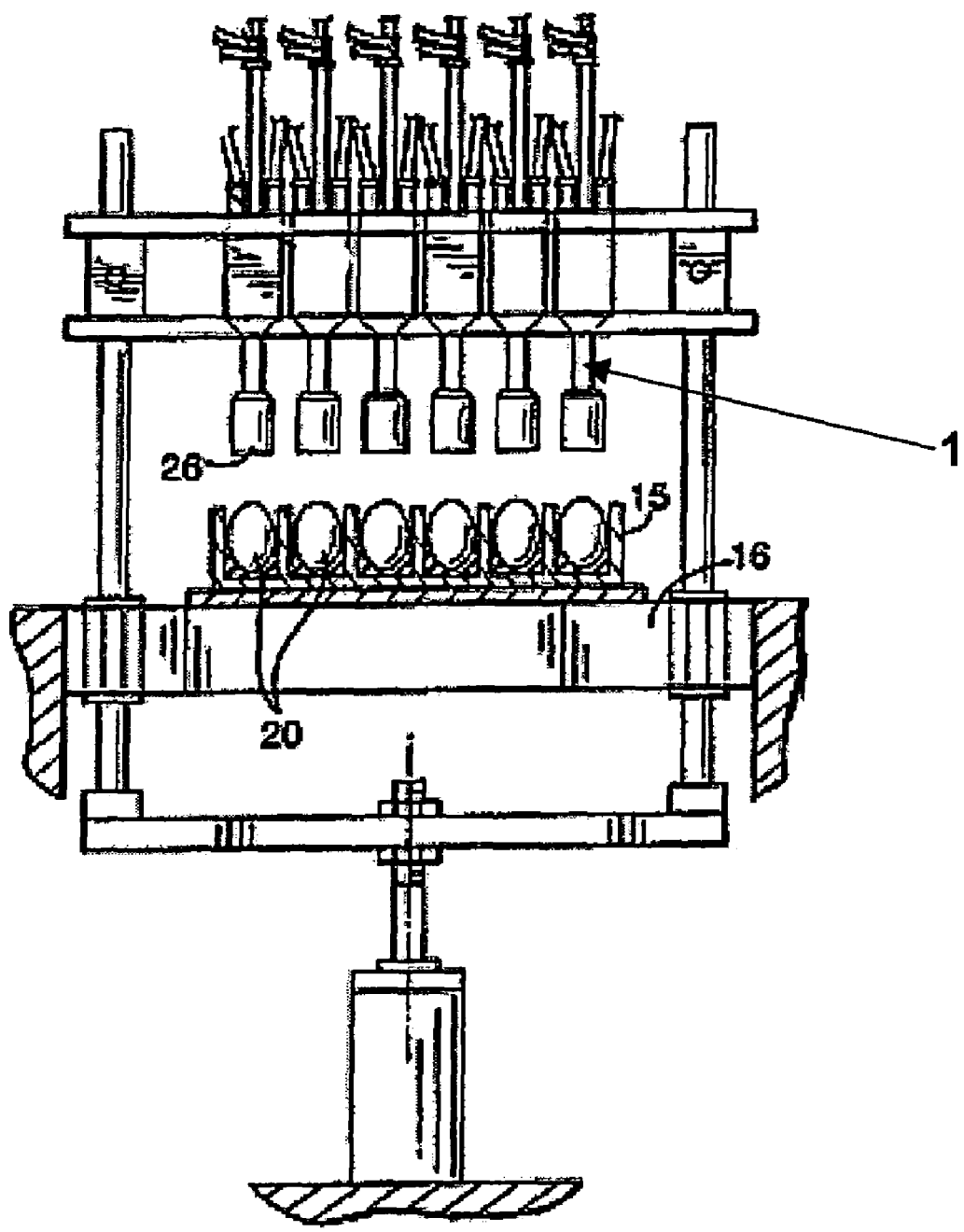
FIG. 2 illustrates a multiple jet injection delivery device according to the invention.
Figure 3A:
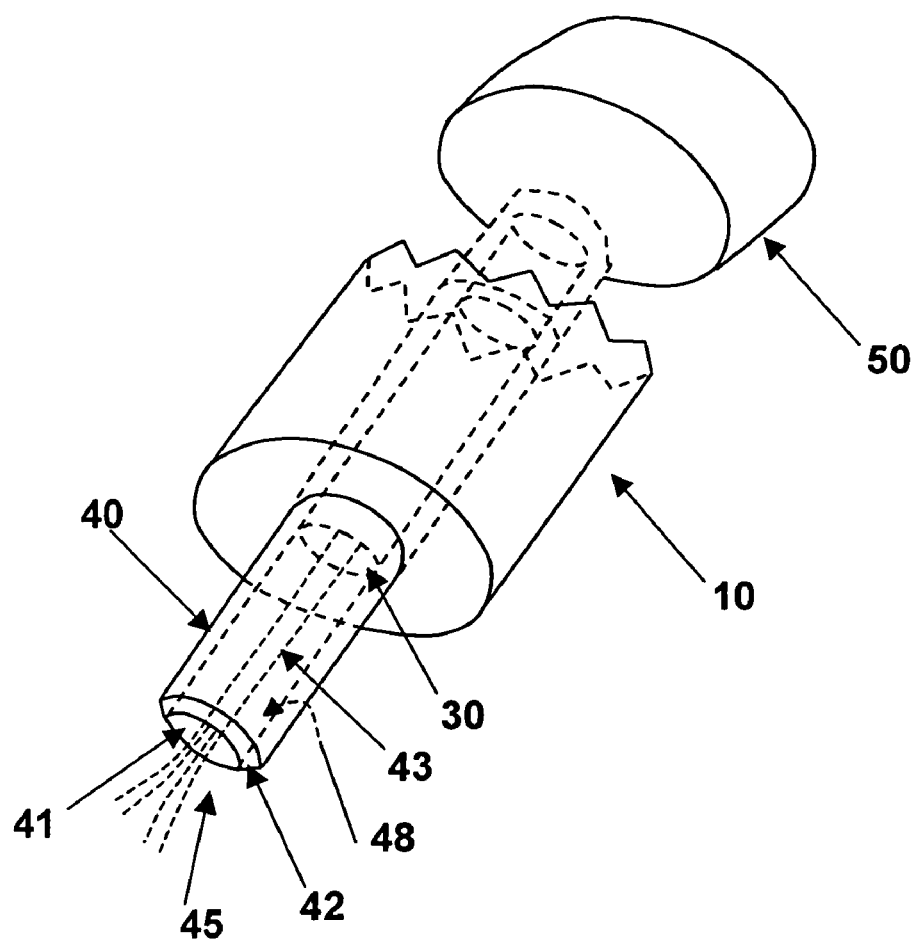
FIG. 3A illustrates a jet injection delivery device head with a tubular egg penetration punch attached thereto.
Figure 3B:
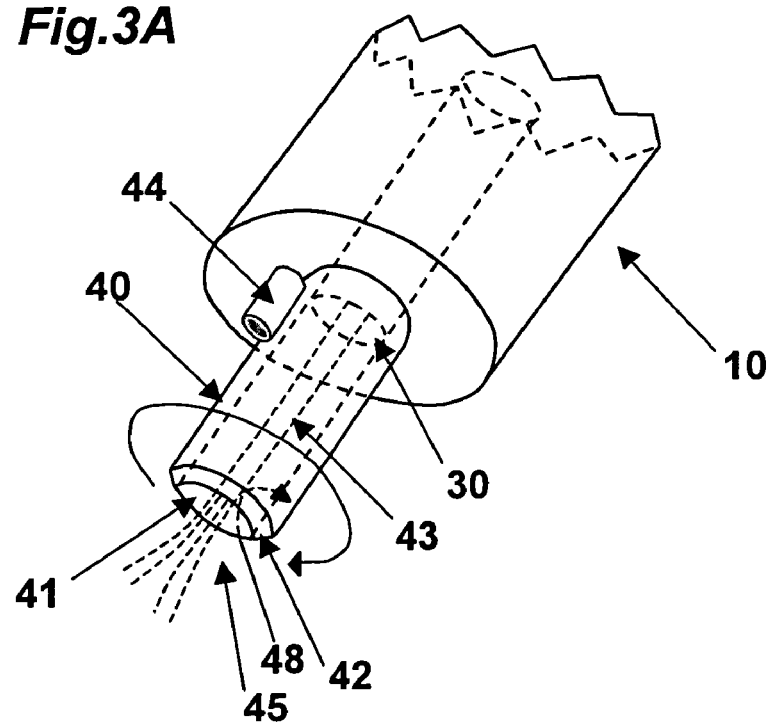
FIG. 3B illustrates a jet injection delivery device head with a rotatable tubular egg penetration punch attached thereto.
Figure 3C:
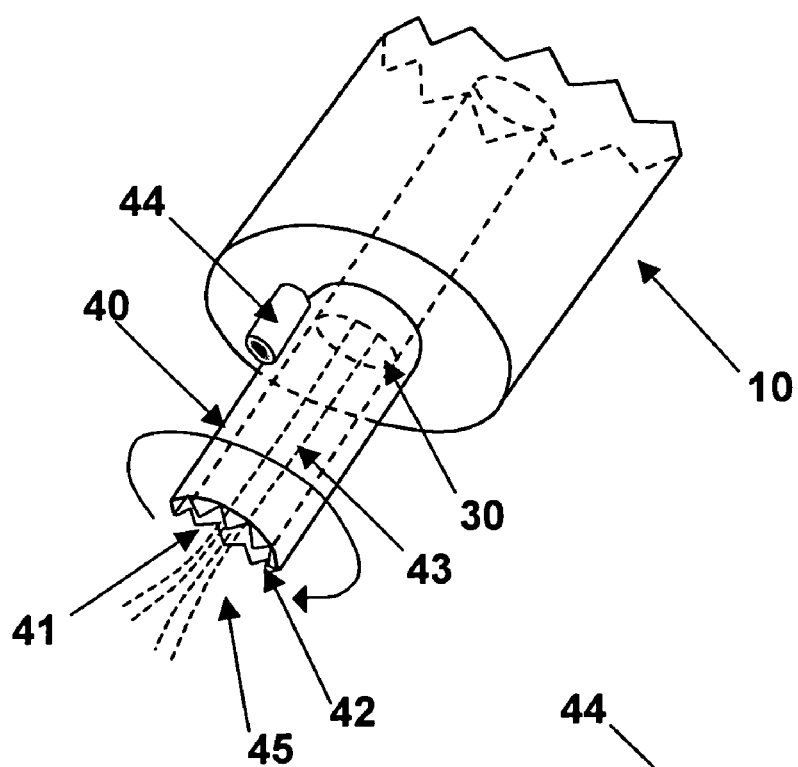
FIG. 3C illustrates a rotatable egg shell penetration device with a toothed end.
Figure 3D:
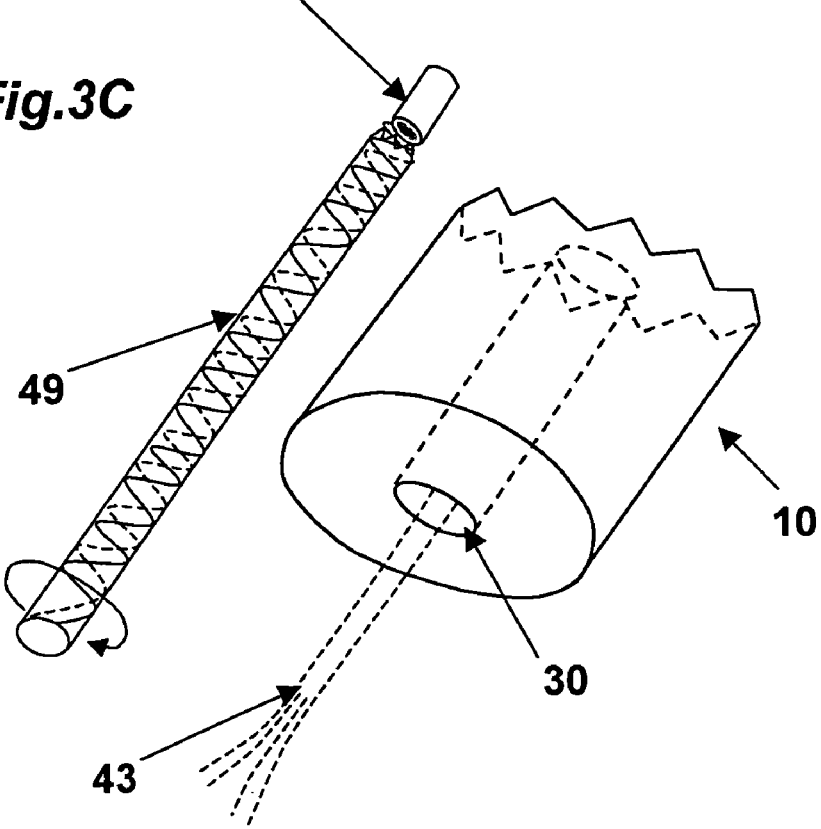
FIG. 3D illustrates a twist drill egg shell penetration device not coaxial with an emitted high pressure liquid stream.

In an alternative embodiment of the invention, the tubular punch 40 is rotatably mounted on the jet injection delivery device 10 to ease the penetration of the hard egg shell in the manner of a drill, as shown, for example in FIG. 3B. A means of rotating the tubular punch 40 such as, but not limited to, an electric or hydraulic motor 44 is operably connected to the punch 40. In this embodiment of the invention, the distal end 45 of a rotating tubular punch 40 may be variously configured to penetrate the egg shell without applying a vertical force that could excessively crack or shatter the shell. For instance, the distal end 45 may be toothed, as illustrated in FIG. 3C, and/or coated with an abrasive, that will progressively grind shell material. In other embodiments of the invention, the egg shell penetration means 40 is a twist drill 49 such as shown in FIG. 3D, or a grinding bit. The tip of the twist drill may also be adapted as a grinding surface to grind a hole in the egg shell.

Figure 3E:
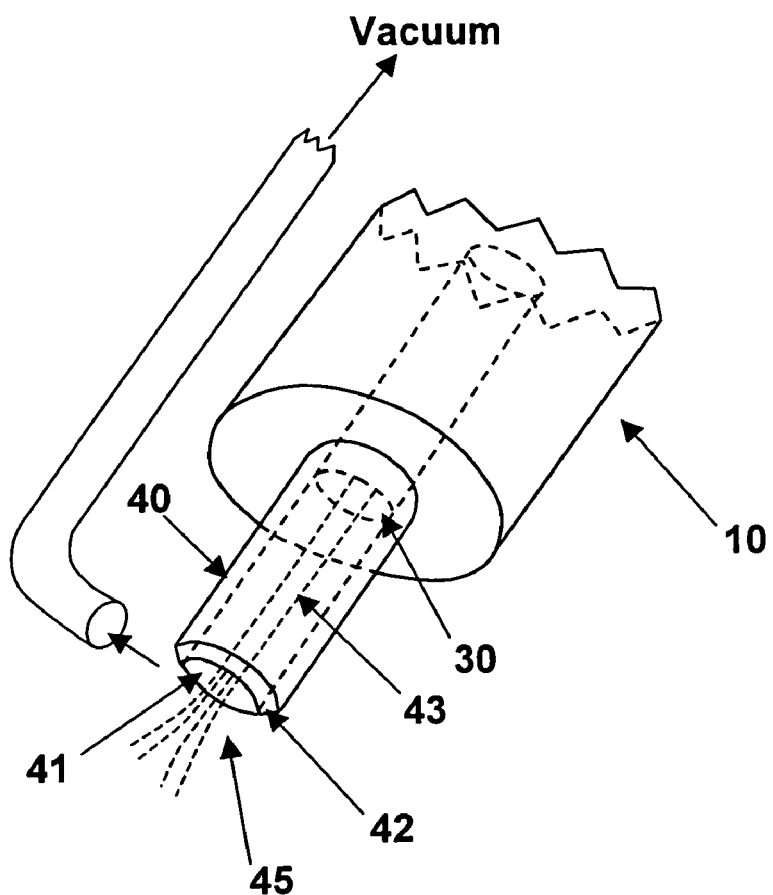
FIG. 3E illustrates a jet injection head having a vacuum system attached for removal of shell debris.
Figure 3F:
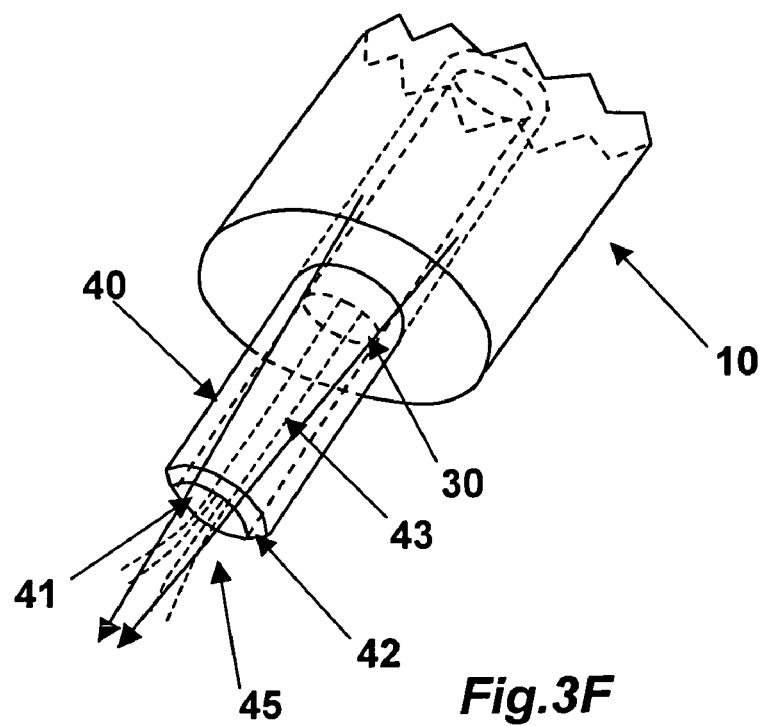
FIG. 3F illustrates a jet injection head incorporating a high pressure gas jet to abrasively pierce a target hard egg shell.

In an embodiment of the invention, the penetration means 40, whether coaxial to the jet injection stream or as a separate unit, is a means of delivering a jet of high pressure gas containing an abrasive material for grinding the egg shell at a targeted site, as illustrated in FIG. 3F. In one embodiment, the high pressure abrasive jet will be directed from the orifice 30 of the jet injection delivery device 10.

To increase the rate of grinding of the egg shell by a mechanical device such as a drill bit or a high pressure gas jet, a liquid lubricant may be directed to the point of penetration. Preferably, the liquid will be sterile and may include a disinfectant for cleaning the penetration site of potentially infectious material. The penetration device 40 may further comprise a means of removing egg shell dust generated by the piercing operation, such as a low pressure or vacuum system 46, as shown, for example, in FIG. 3E.

Figure 4:
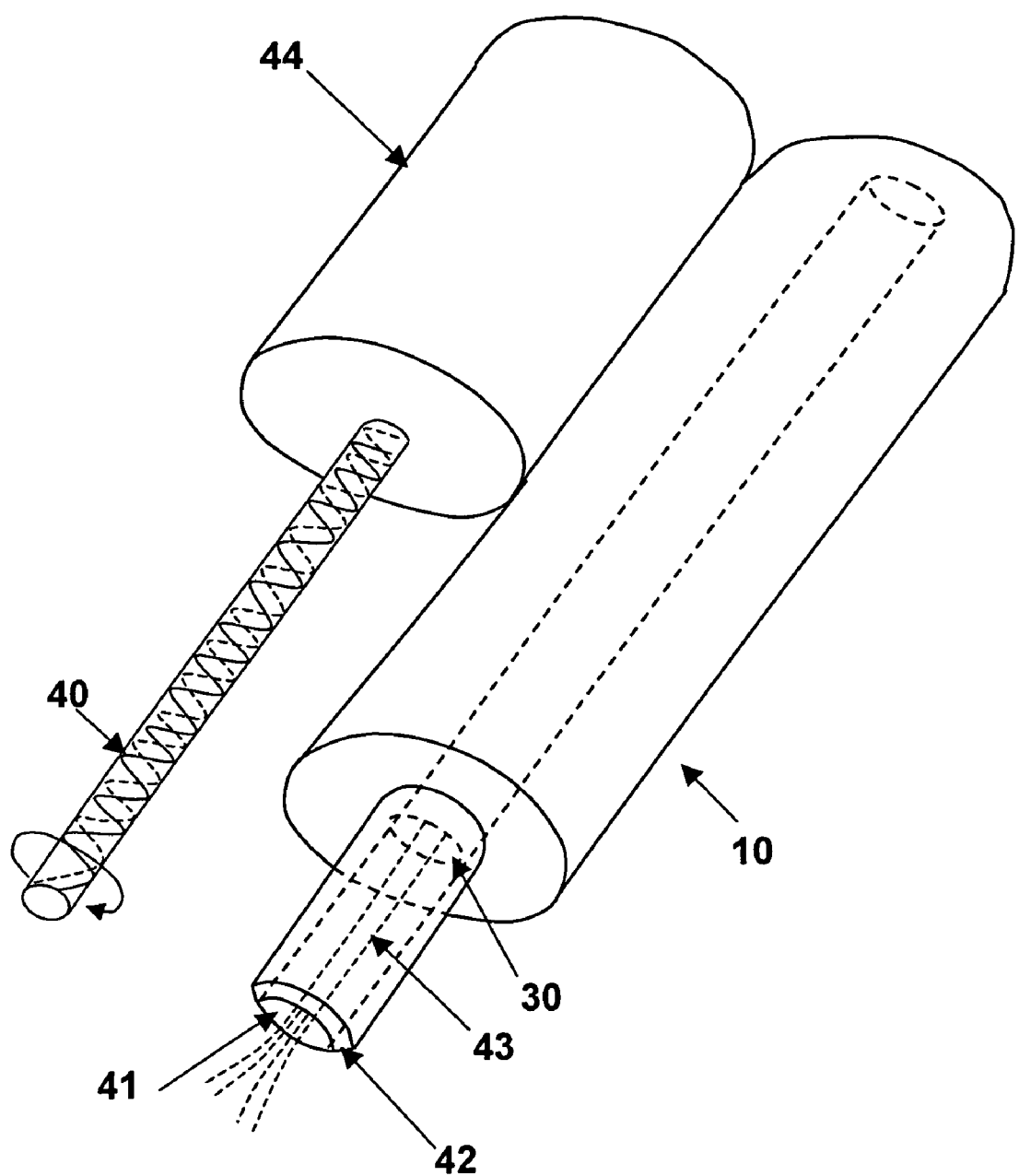
FIG. 4 illustrates an embodiment of the jet injection apparatus according to the invention wherein an egg shell penetration means is secured to the jet injection delivery device.
Figure 5:
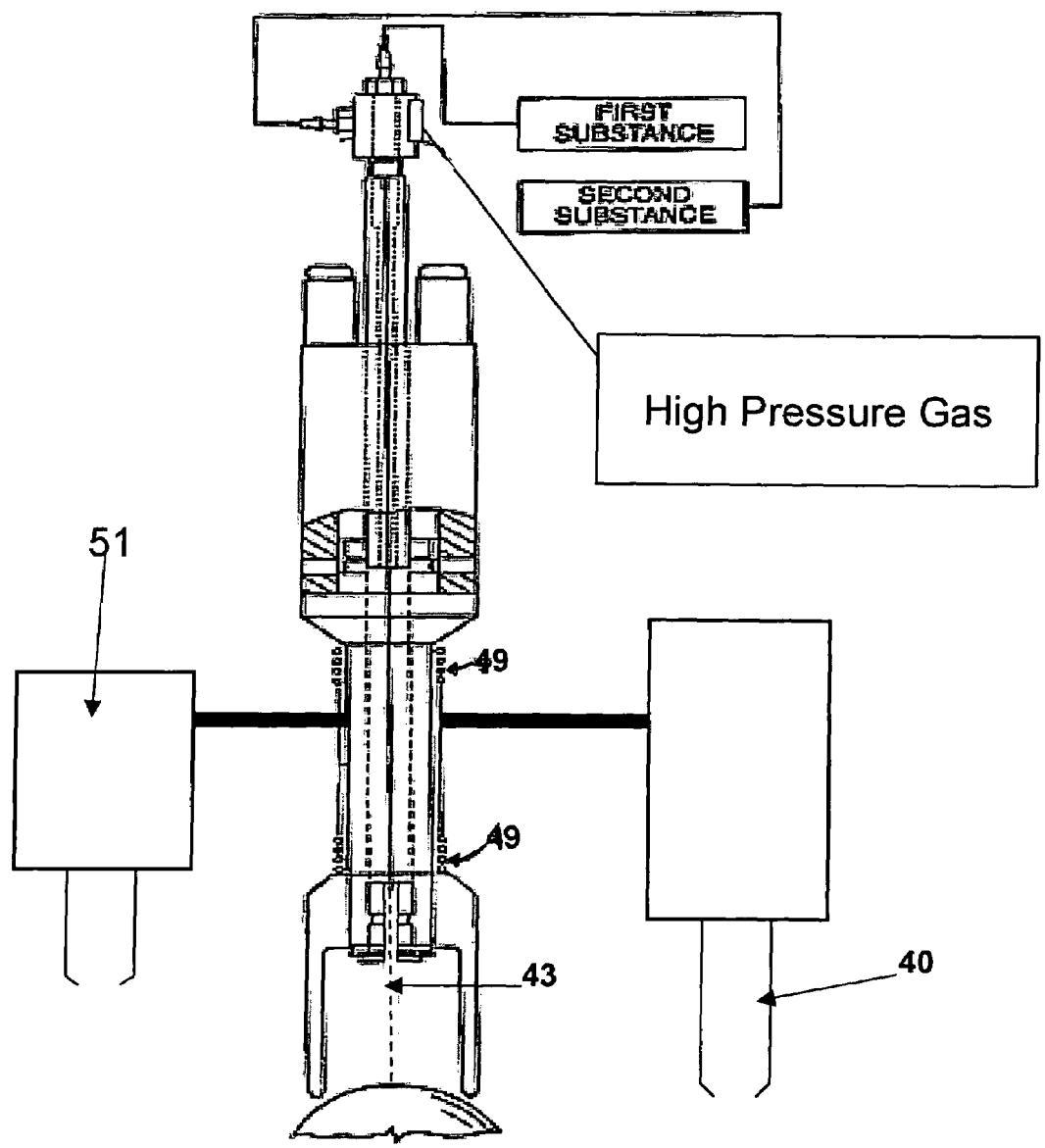
FIG. 5 illustrates an embodiment of the jet injection apparatus according to the invention wherein an egg shell penetration means is a unit separate from the jet injection head and capable of independently locating and contacting a hard egg shell.

In some embodiments of the invention, the eggshell penetration means 40 may not be coaxial with the high pressure stream 43 from the jet injection delivery device 10. The eggshell penetration means 40 can be rigidly attached to the jet injection delivery device 10, as shown for example in FIG. 4, or is a unit separate from the jet injection head as illustrated, for example, in FIG. 5. In any of the embodiments wherein the eggshell penetration means 40 is not coaxial with the jet injection stream, penetration of the shell will typically be at least a two-step operation. In the first step, the penetration means 40 is positioned at the desired entry point of the egg shell and the hole is formed by operating the penetration device 40. In a second step, the penetration device 40 is displaced from the vicinity of the newly-made hole in the shell and the jet injection delivery device 10 is positioned relative to the hole so that a high pressure substance stream 43 from the injection delivery device 10 may pass unimpeded through the hole and into the egg 20. It is further contemplated that if the egg shell penetration means 40 is not coaxial with the high pressure stream 43 from the jet injection delivery device 10, a means 51 to accurately detect the hole in the shell and to position the jet injection device 10 so as to deliver the high pressure stream 43 into the egg may be provided. In one instance, an optical means such as a camera or reflected laser beam may be used to detect the hole and regulate the motion of the jet injection device relative thereto. Accurate positioning of the high pressure stream 43 can also be achieved by accurately engineering and moving the piercing device 40 and the jet injection delivery device 10 from a first or piercing position to the second, or jet injection position.

The jet injection delivery device 10 suitable for use in the present invention may be a single shot deliver device such as, for example, described in U.S. Pat. No. 6,585,685 to Staylor et al. Preferably, however, the injection device is a multi-shot jet injector wherein the treatment substance(s) are feed to the injector head from a reservoir. Such a jet injector delivery device is most suitable for incorporation into an automatic jet injector system where a plurality of eggs is to be injected. In those embodiments of the apparatus 1 wherein there is a plurality of jet injection delivery devices 10 for the treatment of arrays of eggs 20, the treatment substances can be delivered to the jet injection delivery devices 10 from a single reservoir chamber via feed tubes leading to each device, or each jet injector delivery device 10, individually or as a single combined unit, can be operably connected to its own reservoir.

Treatment substances may be administered to an egg as a bolus in the same or different physical form. The bolus of treatment substance may be administered into any suitable compartment of the egg, including intraperitioneally, intramuscularly, or subcutaneously within the embryo, into the yolk sac or stalk, into the liver or lungs of the embryo, into the air cell, the allantoic sac, or the amniotic fluid, etc. In some cases it may be desirable to administer two different substances into different locations within the same compartment (e.g., intraperitoneal or intramuscularly, or even into the amniotic fluid for rapidly absorbed but otherwise incompatible treatment substances). In addition, it may be desirable in some cases for the first and second treatment substances to be the same, but simply administered in different locations within the egg. Treatment substances that may be administered include, but are not limited to, vaccines, hormones, growth-promoting agents, etc.

Figure 6:
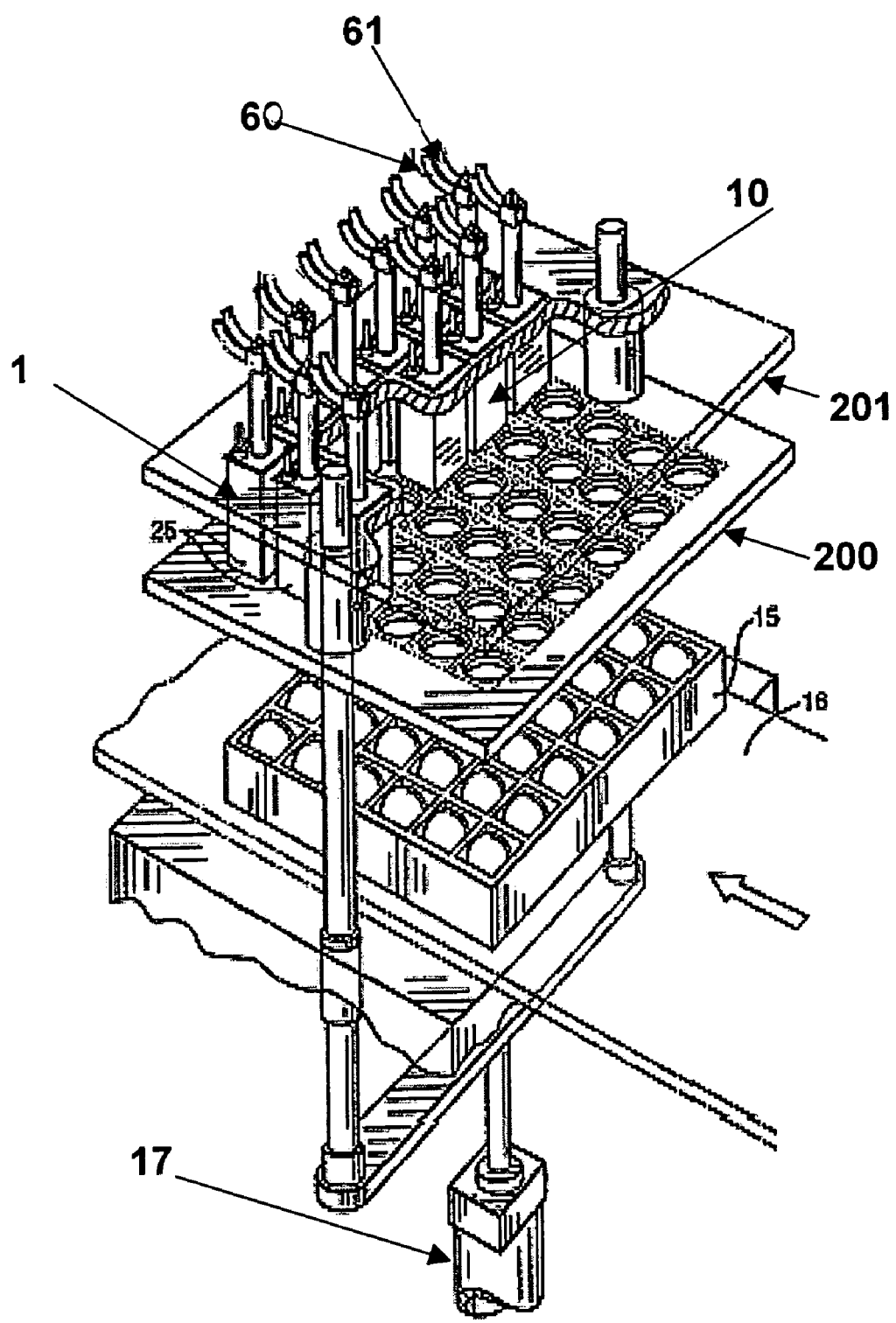
FIG. 6 illustrates one embodiment of an automated jet injection apparatus according to the present invention.

Referring now to the drawings, FIG. 6 illustrates one embodiment of an automated jet injection apparatus 1 according to the present invention. As shown in FIG. 6, the apparatus 1 includes a flat 15, a stationary base 16, and a plurality of jet injection delivery devices 10. The flat 15 holds a plurality of eggs 20 in a substantially upright and aligned position. The flat 15 is configured to provide external access to predetermined areas of the eggs 20. The egg 20 is held in by the flat 15 so that a respective one egg is in proper alignment relative to a corresponding one of the jet injection delivery devices 10 as the jet injection delivery device 10 advances towards the base 17 of the apparatus.

Each of the plurality of jet injection delivery devices 10 has a distal end 45. The jet injection devices 10 may have a first extended position 200 and a second retracted position 201 as shown in FIG. 7B. The jet injection delivery device 10 can be configured with a tubular eggshell penetration means 40 coaxial to the delivered jet stream 43, upon extension of the jet injection device 10, the distal end 45 is configured to contact and rest against predetermined areas of the external egg shell. As shown in FIG. 7B, when not injecting, the jet injection delivery devices 10 can be retracted to rest a predetermined distance 201 above the eggs 20 and stationary base 15.

The automated jet injection device 1 may be horizontally moveable relative to the stationary base 16 so as to position anther flat 15 beneath the plurality of jet injection delivery devices 10. Alternatively, the base 16 can be longitudinally slidably moveable to position the eggs in proper position relative to the injection delivery device 10 (as indicated by the arrow in FIG. 6. For ease of discussion, the description describes a unit with a single jet injection delivery device 10

(shown as a top jet injection delivery device 10) but the description also applies to an apparatus with multiple jet injection delivery devices 10, as shown in FIG. 6 or, alternatively, one or more of single bottom or side devices.

Figure 7A:
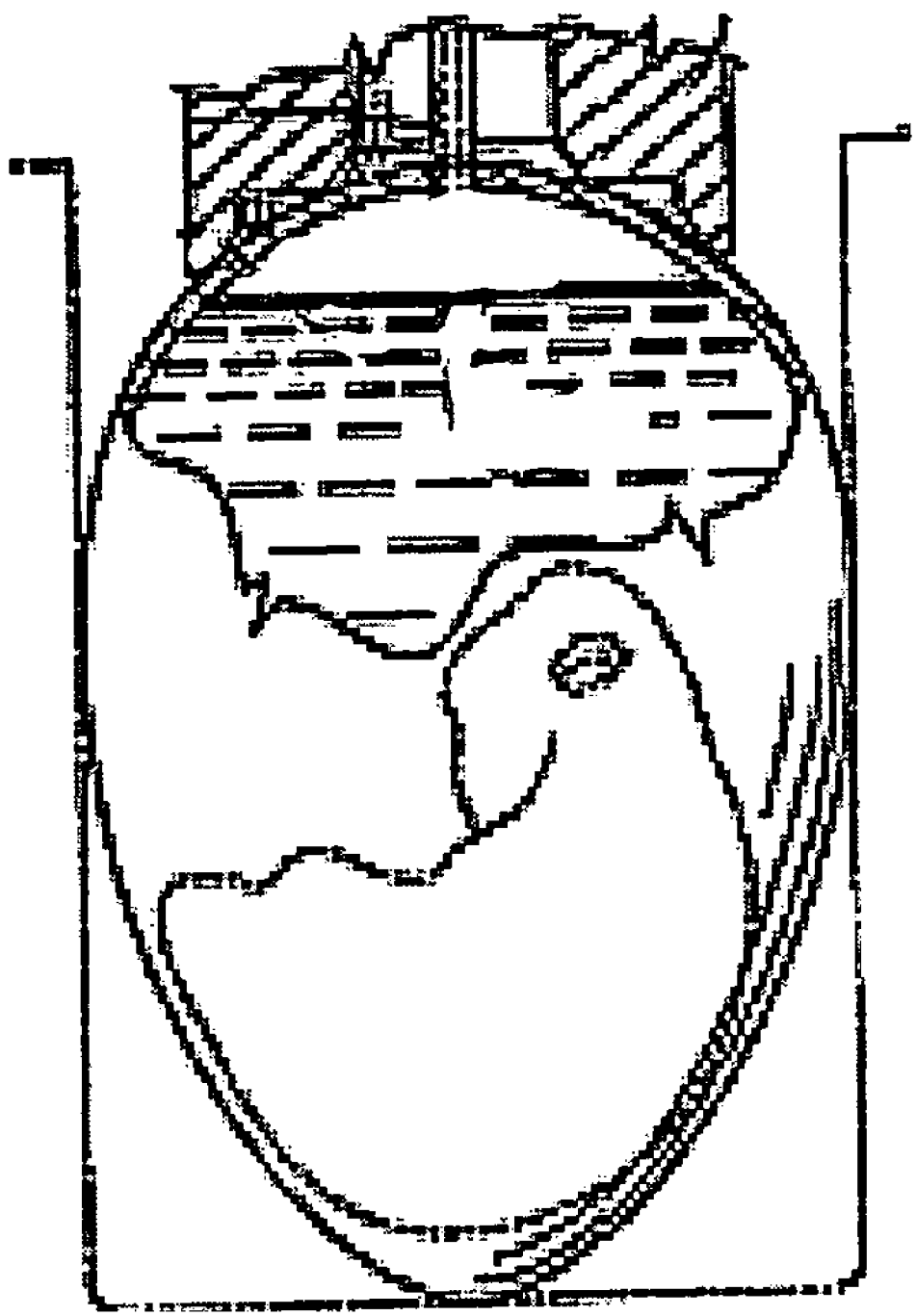
FIG. 7A illustrates a jet injection delivery device configured with a tubular punch coaxial to the delivered jet stream wherein the distal end is configured to contact and rest against predetermined areas of an external egg shell.
Figure 7B:
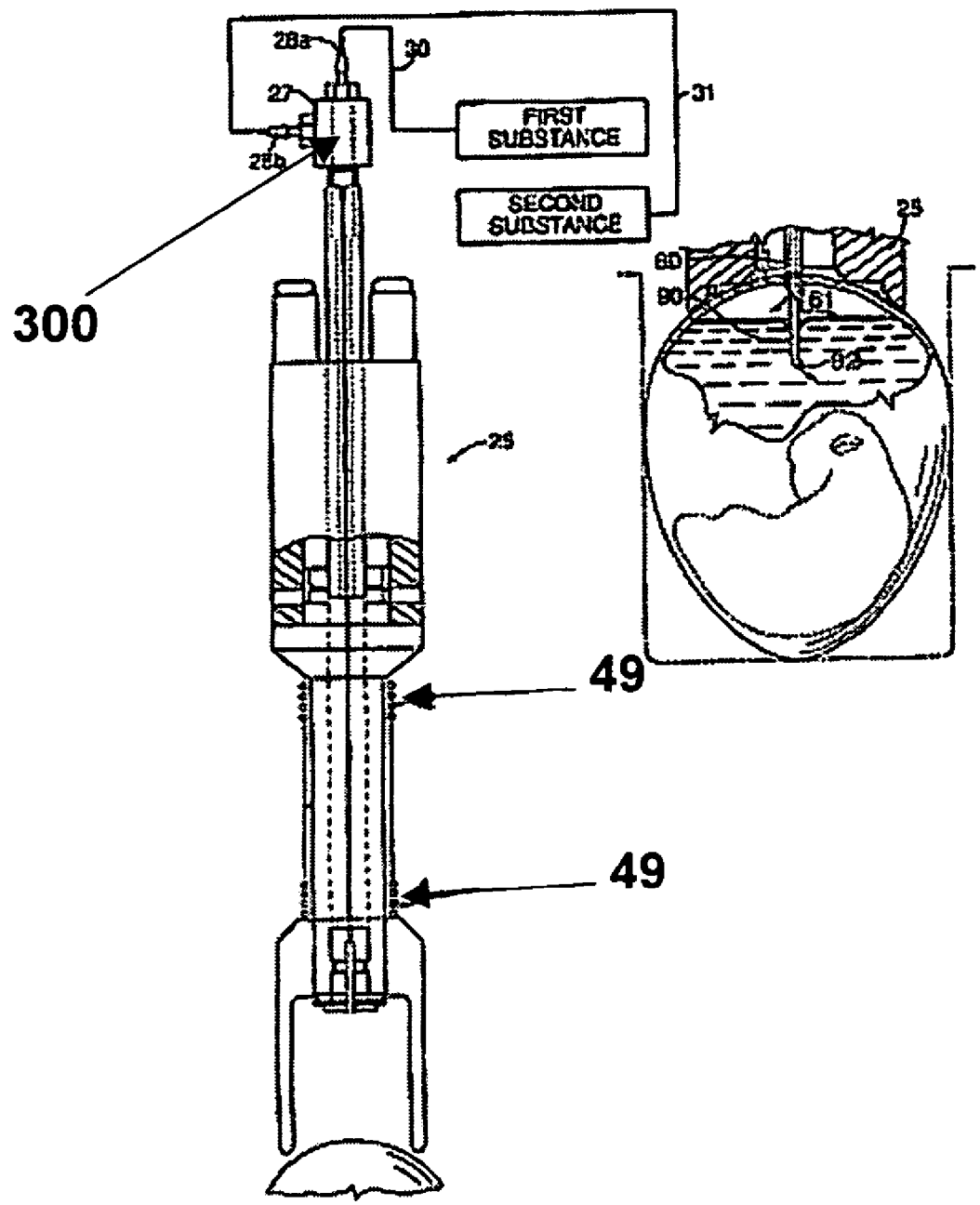
FIG. 7B illustrates the retraced position of jet injection devices to rest a predetermined distance above the eggs and stationary base.

In the embodiments shown in FIGS. 7A and 7B, an in ovo jet injection delivery device 10 for delivering compounds inside an egg comprises a body member 50 and a jet injection delivery device 10. The device includes an egg locating member, or egg engaging member 25, connected to the body member bottom end portion, which as illustrated is slidably connected to the body member and includes a spring 49 to both cushion the engagement, and hold the egg in place during the shell penetration and jet injection of a treatment substance.

It is contemplated that the apparatus will have an eggshell penetration means 40. There may be a plurality of units, each of which is integral with a jet injection delivery device 10 and hence will move into position with the target egg along with the jet injection delivery device 10. In other embodiments of the apparatus, one or a plurality of egg penetration means 40 are not integral with the jet injection delivery devices 10 and are independently positioned over a selected point on the target egg(s), pierce the eggshells and are then displaced from the eggs, thereby allowing the jet injection delivery devices 10 to be positioned to direct the high pressure treatment substance stream(s) into the egg(s).

Figure 8:
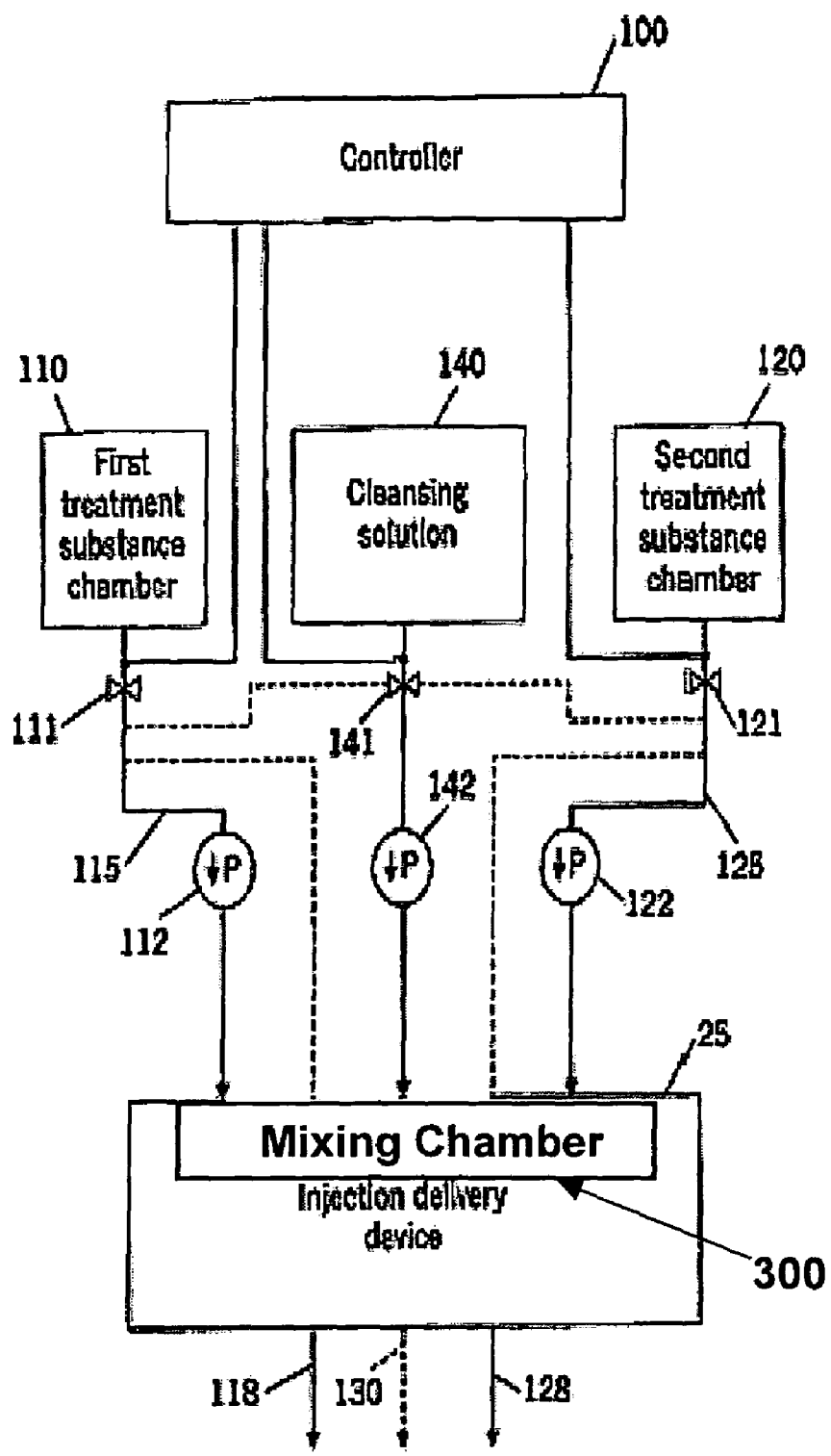
FIG. 8 illustrates a block diagram of one embodiment of the automatic jet injection delivery apparatus according to the invention.

As shown by the block diagram in FIG. 8, one embodiment of the automatic jet injection delivery apparatus 10 includes a main controller 100, a first and second treatment substance chambers 110, 120, associated valves 111, 121 and one or more drive means such as pumps 112, 122 operably associated with the substance chambers for delivering the appropriate amounts of treatment substances to the jet injection delivery device 10 via an optional mixing chamber 150. Although the apparatus 10 is illustrated as having a separate drive means for each fluid or treatment chamber 110, 120, it will be appreciated by one of skill in the art that the invention is not limited thereto. Indeed, a single electric or pneumatic or hydraulic pump can be connected to the substance chambers to deliver each treatment substance to the inlet ports in the jet injection delivery device. The apparatus 1 incorporates one or more pressurization means that, when actuated, will deliver precise dosages of treatment substances from the jet injection delivery devices 10 for high pressure gas ejection through the exit orifice 30 (as shown in FIGS. 3A-3F) as a high pressure stream 43 and ultimately to the egg.

Optionally, as illustrated by the dotted line paths in FIG. 8, the apparatus 10 can be configured to separately store the treatment substances in the respective chambers 110, 120 and then channel them through a mixing chamber 300 as shown in FIG. 7B) or through a single lumen for jet delivery into the egg as in FIG. 3H. A valve, controlled by the controller, is required to alternately switch from one treatment fluid source to the other. Switching can be timed with positioning of the jet injection orifice 30 and the pressure of the jet adjusted so that different fluids are injected in different compartments within the egg. The different treatment substances can each be provided in liquid, gas or aerosol form, or any other suitable form, so long as the substances are substantially separated from one another (e.g., liquid treatment substances separated by an intervening gas bubble) so that different treatment substances are placed in different compartments.

Also preferably, as also shown in FIG. 8, the apparatus 10 can include a cleaning solution chamber 140 operably associated with the controller 100 and plumbed to be in fluid communication with each of the separate substance delivery channels 115, 125 upstream of the exit orifice 30 of the jet injection delivery device 10 as well as the one or more fluid or substance delivery paths 118, 128 (130) in the jet injection device itself 10. This will allow the delivery paths 118, 128 (130) to be flushed with a decontamination fluid to maintain a preferred level of sterility in the apparatus so as to reduce the likelihood of the growth of undesired contaminants in the delivery paths to help maintain the apparatus in optimum performance condition. Any conventional cleansing solution may be used, with chlorine cleansing solutions preferred.

In operation, in one embodiment of the present invention, a controller 100 (as shown in FIG. 8) directs the opening of the valves 111, 121 to release predetermined dosages of treatment substance into first and second tubes 60, 61 shown in FIG. 6. The associated drive means or pumps 112, 122 forces the substances into delivery paths 115, 125 (such as through tubing 60, 61) in fluid communication with a jet injection delivery device exit orifices 30 via inlet ports thereon 28a, 28b. The treatment substances are then forced out of the exit orifice 30 by application of a high pressure gas to the liquid, thereby forming a high pressure jet aimed at the contents of an egg. In one embodiment of the jet injection delivery device 10, the injection head comprises a venturi, wherein the passage of the high pressure gas through the venturi generates a low pressure that draws a liquid treatment substance into the gas stream as illustrated, for example, in FIG. 3G.

The jet injection delivery device 10 is configured to release a predetermined dosage of the treatment substance(s) into predetermined sites, such as above or below the air cell and into the amnion of the avian embryo or into the tissues of the embryo itself (as will be discussed in more detail hereinbelow). The jet injection delivery device is then retracted and may be flushed before the next flat of eggs is advanced.

A jet injection delivery device 10 may have a nozzle head with two lumens that terminate into a single orifice as shown in FIG. 3G. This configuration keeps the substances separate a major portion of the substance delivery path but allows them to mix at the site of jet injection. Note that where two (or more) holes are made in the egg shell, particularly in a configuration that would cause the contents of the shell to drain from the egg, then at least one of the holes (preferably the lower hole) should be sealed, in accordance with known techniques to prevent draining of the egg. Suitable methods for sealing a pierced egg shell include, but are not limited to, sealing with hot glue, covering the hole with a sealing tape, applying a cold glue such as white glue or a cyanoacrylate-based glue, overlaying the hole with a fragment of egg shell and securing thereto or by any other suitable means known to one familiar with methods of sealing eggs to allow development of the embryo therein.

Use of the jet injection delivery device 10 and methods of the invention are preferred over currently used injection methods and apparatus to reduce the risk of yolk sac leaks. One advantage of the jet injection methods of the invention is that the hole required to allow access to the interior of the egg can be small enough to retain the yolk in the egg shell. The apparatus of the instant invention can also employ a jet injection device 10 positioned to direct the high pressure jet stream to the side or bottom of an egg. One or more of these alternative jet injection devices 10 can be used concurrently with a top jet injecting device or subsequent or prior in time. Of course the flat must be altered to provide access to the appropriate part of the egg shell. When injecting from the bottom, it is preferred to position the bottom injection device opposing the top jet injection delivery device.

The methods and apparatus of the invention are particularly useful for delivering treatment substances such as, but not limited to, Newcastle's disease vaccine and Marek's disease vaccine. Marek's disease vaccine is preferably administered into the region defined by the amnion; Newcastle's disease vaccine is preferably administered into the air cell. The protective effect afforded to jet injected chicken embryos treated with the vaccines is shown in Example 3 below.

A "nucleic acid" refers to the phosphate ester polymeric form of ribonuclcosides (adenosine, guanosine, pridine or cytidine; "RNA molecules") or deoxyrubonucleosides (deoxyadenosine, deoxyadenosine, deoxythymidine, or deoxycytidine; "DNA molecules") in either single stranded form, or a double-stranded helix. Double stranded DNA-DNA, DNA-RNA and RNA-RNA helices are possible. The term nucleic acid molecule, and in particular DNA or RNA molecule, refers only to the primary and secondary structures of the molecule, and does not limit it to any particular tertiary forms. Thus, this term includes double-stranded DNA found, inter alia, in linear or circular DNA molecules (e.g., restriction fragments), plasmids and chromosomes. In discussing the structure of particular double-stranded DNA molecules, sequences may be described herein according to the normal convention of giving only the sequence in the 5' to 3' direction along the nontranscribed strand of DNA (i.e., the strand having a sequence homologous to the mRNA).

As defined herein an "isolated" or "substantially pure" nucleic acid (e.g., an RNA, DNA or a mixed polymer) is one which is substantially separated from other cellular components which naturally accompany a native human sequence or protein, e.g., ribosomes, polymerases, many other human genome sequences and proteins. The term embraces a nucleic acid sequence or protein that has been removed from its naturally occurring environment, and includes recombinant or cloned DNA isolates and chemically synthesized analogs or analogs biologically synthesized by heterologous systems.

The term "vector", refers to viral expression systems, autonomous self-replicating circular DNA, plasmid, and includes both expression and nonexpression plasmids. Where a recombinant microorganism or cell culture is described as hosting an "expression vector," this includes both extrachromosomal circular DNA and DNA that has been incorporated into the host chromosome(s). Where a host cell is maintaining a vector, the vector may either be stably replicated by the cells during mitosis as an autonomous structure, or is incorporated within the host's genome. Vectors which may be used include, but are not limited to, pcDNA3.1(+) and pcDNA3.1(−) (commercially available from Invitrogen).

The term "plasmid" refers to an autonomous circular DNA molecule capable of replication in a cell, and includes both the expression and nonexpression types. Where a recombinant microorganism or cell culture is described as hosting an "expression plasmid", this includes latent viral DNA integrated into the host chromosome(s). Where a plasmid is being maintained by a host cell, the plasmid is either being stably replicated by the cells during mitosis as an autonomous structure or is incorporated within the host's genome. The plasmid or vector as contemplated herein comprises a leader sequence which are known to those skilled in the art.

This vector or plasmid may also further comprise a second isolated nucleic acid that encodes a screenable marker and/or a polypeptide. For purposes of this invention, a "polypeptide that is a detectable marker" includes but is not limited to: the dimer, trimer and tetramer form of the polypeptide. E. coli β-galactosidase is a tetramer composed of four polypeptides or monomer sub-units.

The present invention is particularly useful to deliver DNA vaccines to a developing avian embryo and in particular to deliver the vaccine vector construct to the breast muscle of the embryo for expression therein of the target antigen. DNA vaccines are described in U.S. Pat. Nos. 5,589,466 and 5,973,972, and PCT published applications PCT/US90/01515, PCT/US93/02338, PCT/US93/048131, and PCT/US94/00899, and the priority applications cited therein, which are each incorporated herein by reference. Further, the review articles cited above describe DNA vaccine technology and cite examples of DNA vaccines. Exemplary poultry directed vaccines include those targeted to such diseases as, but not limited to, Marek's disease, IBDV, Infectious Bursal disease, coccidial infection, Newcastle Disease virus or ILT. In each case, plasmid or viral DNA can be delivered to cells of an individual which take up the construct DNA and express immunogenic target proteins encoded by the vectors. The immune response generated against the immunogenic target protein provides a prophylactic or therapeutic benefit to the vaccinated individual.

According to the present invention, the coding sequence on the vector that encodes the immunogenic target protein is provided with a coding sequence that encodes an amino acid sequence whose presence on the protein results in a specific intracellular localization of the expressed protein. The nucleotide sequences that encode amino acid sequences which direct intracellular protein trafficking and which are included in the coding sequences of immunogenic proteins that are included in vector constructs used as DNA vaccine compositions direct localization to specific areas in the cells which result in enhancement of specific immune responses.

As used herein, the term "genetic construct" is meant to refer to plasmids or modified viruses which comprise coding sequences that encode an immunogenic target protein and an amino acid sequence that directs intracellular protein trafficking, the coding sequences being operably linked to regulatory elements required for expression of the coding sequences in eukaryotic cells. Regulatory elements for DNA expression include a promoter and a polyadenylation signal. In addition, other elements, such as a Kozak region, may also be included in the genetic construct. Initiation and termination signals are required regulatory elements that are often considered part of the coding sequence. The coding sequences of genetic constructs of the invention include functional initiation and termination signals.

As used herein, the term "immunogenic target protein" is meant to refer to an antigen that is a target for an immune response which is directed at proteins associated with conditions, infections, diseases or disorders such as allergens, pathogen antigens, antigens associated with cancer cells or cells involved in autoimmune diseases. The immunogenic target antigen is encoded by the coding sequence of a genetic construct used in a DNA vaccine. The DNA vaccine is administered to the vaccinated individual, the genetic construct is taken up by the cells of the individual, the coding sequence is expressed and the immunogenic target protein is produced. The immunogenic target protein induces an immune response against the immunogenic target protein in the individual. The immune response is directed against proteins associated with conditions, infections, diseases or disorders such as allergens, pathogen antigens, antigens associated with cancer cells or cells involved in autoimmune diseases. Thus the vaccinated individual may be immunized prophylactically or therapeutically to prevent or treat conditions, infections, diseases or disorders. The immunogenic target protein refers to peptides and protein encoded by gene constructs of the present invention that act as target proteins for an immune response. The term "immunogenic target protein" refers to a protein against which an immune response can be elicited. The immunogenic target protein shares at least an epitope with a protein from the allergen, pathogen or undesirable protein or cell-type such as a cancer cell or a cell involved in autoimmune disease against which immunization is required. The immune response directed against the immunogenic target protein will protect the individual against and treat the individual for the specific infection or disease with which the protein from the allergen, pathogen or undesirable protein or cell-type is associated. The immunogenic target protein does not need to be identical to the protein against which an immune response is desired. Rather, the immunogenic target protein must be capable of inducing an immune response that cross reacts to the protein against which the immune response is desired.

Further, the nucleic acid which encodes a polypeptide is selected from a group consisting of a: cytokine, Infectious bovine rhinotracheitis virus gE, bovine respiratory syncytial virus attachment protein (BRSV G), bovine respiratory syncytial virus fusion protein (BRSV F), bovine respiratory syncytial virus nucleocapsid protein (BRSV N), bovine parainfluenza virus type 3 fusion protein, and the bovine parainfluenza virus type 3 hemagglutinin neuramimidase, marek's disease virus glycoprotein B, marek's disease virus glycoprotein D, newcastle disease virus hemagglutinin, newcastle disease virus neuramimidase, newcastle disease virus fusion, infectious bursal disease virus VP1, infectious bursal disease virus VP2, infectious bursal disease virus VP3, infectious bursal disease virus VP4, infectious bursal disease virus VP5, infectious bursal disease virus polyprotein, infectious bronchitis virus spike, and infectious bronchitis virus matrix and chick anemia virus.

Such may also be derived or derivable from avian encephalomyelitis virus, avian reovirus, avian paramyxovirus, avian influenza virus, avian adenovirus, fowl pox virus, avian coronavirus, avian rotavirus, chick anemia agent, *Salmonella* spp., *E. coli.*, *Pasteurella* spp., *Bordetella* spp. *Eimeria* spp. *Histomonas* spp., *Trichomonas* spp., poultry nematodes, cestodes, trematodes, poultry mites/lice, poultry protozoa.

As contemplated herein cytokines, include but are not limited to the following: chicken myclomonocytic growth factor (cMGF) or chicken interferon (cIFN), transforming growth factor beta, epidermal growth factor family, fibroblast growth factors, hepatocyte growth factor, insulin-like growth factor, vascular endothelial growth factor, interleukin 1, IL-1 receptor antagonists, interleukin-2, interleukin-3, interleukin-4, interleukin-5, interleukin-6, IL-6 soluble receptor, interleukin-7, interleukin-8, interleukin-9, interleukin-10, interleukin-ii, interleukin-12, interleukin-13, angiogenin, chemokines, colony stimulating factors, granulocyte-macrophage colony stimulating factors, erythropoietin, interferon, interf infectious bursal disease virus VP3 infectious bursal disease virus VP3 eron gamma, Stem cell factor (or known as mast cell growth factor, or c-kit ligand protein), leukemia inhibitory factor, oncostatin M, pleiotrophin, secretory leukocyte protease inhibitor, stem cell factor, tumor necrosis factors, soluble TNF receptors and immunostimulating sequence (ISS).

The isolated nucleic acid may be under the control of an endogenous upstream promoter, or it may be put under control of a heterologous upstream promoter. Promoters include but are not limited to the following: cytomegalovirus, Rous Sarcoma Virus, synthetic pox viral promoter, pox synthetic late promoter 1, pox synthetic late promoter 2 early promoter 2, pox 01 L promoter, pox 14L promoter, pox 13L promoter; pox 12L promoter, pox 11L promoter, pox DIOR promoter, PRV gX, HSV-1 alpha 4, chicken beta-actin promoter, HCMV immediate early, MDV gA, MDV gB, MDV gD, ILT gB, BHV-1.1 VP8 and ILT gD and internal ribosomal entry site promoter. In a preferred embodiment the promoter is a human cytomegalovirus promoter.

As provided herein, the vaccine may be used for administration to an avian having an avian pathogen or disease. Such pathogens or diseases are known to those skilled in the art and include but are not limited to: Infectious Bursal Disease Virus, Newcastle Disease Virus, *Mycoplasma gallisepticum, Mycoplasma synoviac, Salmonella enteritidis, Salmonella typhimurium, E. coli, Riemerella anatipestifer*, Tuberculosis (*Mycobacterium avium*), Infectious *Coryza, Campylobacter, Staphylococcus aureus, clostridium, Erysipelothrix, Chlamydia*, Marek's disease virus, Retroviridae (avian leukosis virus), Infectious Bronchitis Virus, Laringotrachitis Virus, Avian Encephalomyelitis Virus, Influenza Virus, Hemorrhagic Enteritis Virus, Egg Drop Syndrome Virus, Pox Virus, Duck Hepatitis Virus, Duck Virus Enteritis, Reoviruses, Goose Parvovirus, Israel Turkey meningoencephalitis Virus (Flaviviridae). In a preferred embodiment the disease is infectious Bursal Disease Virus.

Suitable carriers for the vaccine are well known to those skilled in the art and include but are not limited to proteins, sugars, etc. One example of such a suitable carrier is a physiologically balanced culture medium containing one or more stabilizing agents such as hydrolyzed proteins, lactose, etc. The live vaccine can be created by taking tissue culture fluids and adding stabilizing agents such as stabilizing hydrolyzed proteins. Further, as used herein "acceptable carrier" are well known to those skilled in the art and include, but are not limited to, 0.01-0.1M and preferably 0.05M phosphate buffer or 0.8% saline.

Additionally, such pharmaceutically acceptable carrier may be aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's or fixed oils. Intravenous vehicles include fluid and nutrient replenishers, electrolyte replenishers such as those based on Ringer's dextrose, and the like. Preservatives and other additives may also be present, such as, for example antimicrobials, antioxidants, chelating agents, inert gases and the like.

The term "adjuvant" refers to a compound or mixture that enhances the immune response to an antigen. An adjuvant can serve as a tissue depot that slowly releases the antigen and also as a lymphoid system activator that non-specifically enhances the immune response (Hood et al., Immunology, Second Ed., 1984, Benjamin/Cummings: Menlo Park, Calif., p. 384). Often, a primary challenge with an antigen alone, in the absence of an adjuvant, will fail to elicit a humoral or cellular immune response. Adjuvants include, but are not limited to, complete Freund's adjuvant, incomplete Freund's adjuvant, saponin, mineral gels such as aluminum hydroxide, surface active substances such as lysolecithin, pluronic polyols, polyanions, peptides, oil or hydrocarbon emulsions, keyhole limpet hemocyanins, dinitrophenol, and potentially useful human adjuvants such as BCG (*bacille Calmette-Guerin*) and *Corynebacterium parvum*).

The present invention encompasses a method for enhancing an avian immune response which comprises administering to the avian egg an effective amount of the vaccine for protecting an avian against a disease organism such as a virus which comprises an effective immunizing amount of a vector comprising 1) one or more isolated nucleic acids encoding a polypeptide, wherein said nucleic acid is under the control of a promoter; and 2) a suitable carrier and/or an adjuvant.

The present invention also provides a method of immunizing an avian comprising administrating to the avian egg an effective amount of the vaccine. Such pathogens or diseases are known to those skilled in the art and include but are not limited to: Infectious Bursal Disease Virus, Newcastle Disease Virus, and/or *Mycoplasma gallisepticum*. The vaccine may be administered in conjunction with live or attenuated vaccines that are known to those skilled in the art. As contemplated herein the present vaccine or vector may be administered in combination with other vaccines that are known to those skilled in the art.

For purposes of this invention, an "effective immunizing amount" of the vaccine of the present invention is within the range of 1 ug to 100 mg. In another embodiment the immunizing amount is of 1 ng to 100 ng. In a preferred embodiment the immunizing amount is 100 ug.

As disclosed in U.S. Pat. Ser. No. 6,464,984 to Audonnet et al., which is incorporated herein by reference in its entirety, the vaccine may comprise more than one valency and comprise at least one plasmid, integrating so as to express in vivo in the host cells a gene with one or more avian pathogen valencies, these valencies being selected from the group consisting of Marek's disease virus (MDV), Newcastle's disease virus (NDV), infectious bursal disease virus (IBDV), infectious bronchitis virus (IBV), infectious anaemia virus (CAV), infectious laryngotracheitis virus (ILTV), encephalomyelitis virus (AEV or avian leukosis virus ALV), pneumovirosis virus, and avian plague virus, the plasmids comprising, for each valency, one or more of the genes selected from the group consisting of, but not limited to, gB and gD for the Marek's disease virus, HN and F for the Newcastle disease virus, VP2 for the infectious bursal disease virus, S, M and N for the infectious bronchitis virus, C+NSI for the infectious anaemia virus, gB and gD for the infectious laryngotracheitis virus, env and gag/pro for the encephalomyelitis virus, F and G for the pneumovirosis virus and HA, N and NP for the avian plague virus.

Valency in the present invention is understood to mean at least one antigen providing protection against the organism, such as a virus, for the pathogen considered, it being possible for the valency to contain, as subvalency, one or more natural or modified genes from one or more strains of the pathogen considered.

Advantageously, the vaccine formula according to the invention may comprise, but is not intended to be limited to, more than one valency including, for example, at least three valencies chosen from, but not limited to, Marek, infectious bursal, infectious anaemia and Newcastle. The infectious bronchitis valency can also preferably be added thereto.

On this basis of 3, 4 or 5 valencies, it will be possible to add one or more of the avian plague, laryngotracheitis, pneumovirosis and encephalomyelitis valencies.

As regards the Marek valency, two genes may be used encoding gB and gD, in different plasmids or in one and the same plasmid. For the Newcastle valency, the two HN and F chains, integrated into two different plasmids or into one and the same plasmid, are preferably used. For the infectious bronchitis valency, the use of the S gene is possible. The S and M can be associated in a single plasmid or in different plasmids. For the infectious anaemia valency, the two C and NS1 genes are preferably associated in the same plasmid. For the infectious laryngotracheitis valency, the use of the gB gene alone is preferred. Optionally, but less preferably, the two gB and gD genes can be associated in different plasmids or in one and the same plasmid.

For the avian plague valency, the use of the HA gene is advantageous although it is possible to use the associations HA and NP or HA and N in different plasmids or in one and the same plasmid. The HA sequences from more than one influenza virus strain, in particular from the different strains found in the field, may be associated in the same vaccine. On the other hand, NP provides cross-protection and the sequence from a single virus strain will therefore be satisfactory. For the encephalomyelitis valency, the use of env is preferred.

The vaccine formula according to the invention can be presented in a dose volume of between 0.1 and 1 ml and in particular between 0.3 and 0.5 ml.

The dose will be generally between 10 ng and 1 mg, preferably between 100 ng and 800 µg and preferably between 0.1 µg and 50 µg per plasmid type.

Use will be preferably made of naked plasmids, simply placed in the vaccination vehicle which will be in general physiological saline and the like. It is of course possible to use all the polynucleotide vaccine forms described in the prior art and in particular formulated in liposomes.

Each plasmid comprises a promoter capable of ensuring the expression of the gene inserted, under its control, into the host cells. This will be in general a strong eukaryotic promoter and in particular a cytomegalovirus early CMV-IE promoter of human or murine origin, or optionally of another origin such as rats, pigs and guinea pigs.

More generally, the promoter may be either of viral origin or of cellular origin. As viral promoter other than CMV-IE, there may be mentioned the SV40 virus early or late promoter or the Rous sarcoma virus LTR promoter. It may also be a promoter from the virus from which the gene is derived, for example the gene's own promoter. As cellular promoter, there may be mentioned the promoter of a cytoskeleton gene, such as, for example, the desmin promoter (Bolmont et al., J. Submicroscopic Cytol. and Pathol. (1990) 22: 117-122; and Zhenlin et al., Gene, (1989) 78: 243-254), or alternatively the actin promoter. When several genes are present in the same plasmid, these may be presented in the same transcription unit or in two different units.

The combination of the different vaccine valencies may be preferably achieved by mixing the polynucleotide plasmids expressing the antigen(s) of each valency, but it is also possible to envisage causing antigens of several valencies to be expressed by the same plasmid.

The methods of the invention, therefore, encompass the injection of a monovalent vaccine formulae comprising one or more plasmids encoding one or more genes from one of the viruses above, the genes being those described above. Besides their monovalent character, these formulae may possess the characteristics stated above as regards the choice of the genes, their combinations, the composition of the plasmids, the dose volumes, the doses and the like.

The monovalent vaccine formulae may also be used (i) for the preparation of a polyvalent vaccine formula as described above, (ii) individually against the actual pathology, (iii)

associated with a vaccine of another type (live or inactivated whole, recombinant, subunit) against another pathology, or (iv) as booster for a vaccine as described below.

Another exemplary treatment substance is a biologically active substance such as a vaccine, antibiotic, hormone, probiological culture (e.g., a competitive exclusion media), and the other is a marker such as a dye. The marker can serve as a positive control to confirm injection, for example in the case of eggs subsequently found to be nonviable.

Another aspect of the invention provides a jet injection method for treating an avian embryo in ovo, the method comprising the steps of orienting an avian egg into a predetermined position, introducing a first opening into the shell of said egg, positioning a jet injection delivery device relative to the first opening whereby the jet injection delivery device can direct a jet injection stream through the first opening and into the egg, releasing a predetermined dosage of a first treatment substance as a high pressure stream by jet injection into the egg and retracting the jet injection delivery device from the egg, thereby treating the avian embryo. The jet injection procedure is capable of delivering a liquid sample to any desired region of a target bird egg, including to the air sac, allantois, embryo (including subcutaneously as evidenced by the jet injection of dye into multiple embryos.

The jet injection methods according to the invention allow for the production of viable chicks from treated eggs, as shown in Example 2 below. The jet injection of vaccines specifically directed against viral diseases of birds, and in particular of chickens can elicit an immune response that affords protection against subsequent exposure and challenge of the pathological virus, as shown in Example 3 below. The jet injection methods of the invention will also deliver virus to the embryos (see Tables 8 and 9 below).

In one embodiment of the invention, the method further comprises the step of delivering a predetermined dosage of a second treatment substance by jet injection into the egg. In another embodiment, the first and second treatment substances are jet injected into different compartments of the egg. Another embodiment of the methods of the invention further comprises the steps of introducing a second opening into the egg shell separate from the first opening and positioning a jet injection delivery device to direct a jet injection stream through the second small opening and into the egg.

In various embodiments of the methods of the invention, at least one treatment substance is jet injected into the air cell, the yolk sac, allantois, amnion or the embryo. In various embodiments of the methods of the invention, at least one treatment substance is jet injected into the air cell and another treatment substance is introduced via the jet injection device into the yolk sac, allantois, amnion or embryo.

In one embodiment of the invention, the opening is introduced by piercing the shell with a drill device.

In another embodiment of the invention, the opening is introduced by piercing the shell with a tubular punch, the lumen of which is coaxial with the direction of the high pressure stream emitted from a jet injection device, and wherein the jet injection stream is delivered through the lumen of the tubular punch.

In another embodiment of the invention, the opening in the egg shell is introduced by piercing the shell with a gas stream. The gas stream may further comprise an abrasive.

In one embodiment of the invention, the gas stream further comprises a liquid lubricant. In another embodiment of the invention, the gas stream further comprises a disinfectant. In one embodiment of the invention, the liquid lubricant is a disinfectant.

In one embodiment of the invention, the first and second treatment substances are delivered into the egg sequentially in time.

In another embodiment of the invention, the method further comprises the step of resealing the eggshell. The step of resealing the eggshell may further comprise applying to a hole in the eggshell a glue seal, a sealing membrane or a combination thereof.

The invention further provides a jet injection method for treating avian embryos in ovo comprising the steps of orienting an avian egg into a predetermined position, positioning a shell piercing means to a predetermined position on the shell surface, piercing the shell of the avian egg, positioning a jet injection delivery device relative to the opening, whereby the jet injection delivery device can direct a jet injection stream through the opening and into the egg, retracting the jet injection delivery devices from the egg, thereby treating the avian embryo, and resealing the egg.

The invention further provides a jet injection method for inducing a protective response to an infectious agent in an avian, comprising the steps of orienting an avian egg into a predetermined position, positioning a shell piercing means to a predetermined position on the shell surface, piercing the shell of the avian egg, positioning a jet injection delivery device relative to the opening, whereby the jet injection delivery device can direct a jet injection stream through the opening and into the egg, wherein the jet injection stream comprises a pharmaceutical substance capable of inducing a protective response in an avian against an infectious agent, retracting the jet injection delivery devices from the egg, thereby treating the avian embryo, resealing the egg, and incubating the treated egg, thereby allowing a protective response to develop. In one embodiment of this method of the invention, the pharmaceutical substance is an antigen capable of eliciting an immune response in a bird.

In another embodiment, the pharmaceutical substance is jet injected into the breast muscle of a bird. The pharmaceutical substance may be a DNA vaccine. In one embodiment, the DNA vaccine elicits a protective response against Marek's disease, IBDV, Infectious Bursal disease, coccidial infection, Newcastle Disease virus or ILT.

The invention also provides a jet injection method for treating avian embryos in ovo comprising the steps of orienting an avian egg into a predetermined position, positioning a shell piercing means to a predetermined position on the shell surface, introducing a first opening into the shell of an avian egg, introducing a second opening into the shell of an avian egg, the second opening being spaced apart from the first opening, positioning a first jet injection delivery device relative to the first opening whereby the first jet injection delivery device can direct a first jet injection stream through the first opening and into the egg, positioning a second jet injection delivery device relative to the second opening whereby the second jet injection delivery device can direct a second jet injection stream through the second opening and into the egg, releasing a predetermined dosage of a first treatment substance from the first jet injection delivery device into the egg, releasing a predetermined dosage of a second treatment substance from the second delivery device into the egg, retracting the first and second jet injection delivery devices from the egg, thereby treating the avian embryo, and resealing the egg shell.

In one embodiment of this aspect of the invention, the method further comprises the step of jet injecting the first and second treatment substances simultaneously through a single orifice of the jet injection delivery device.

In one embodiment of this aspect of the invention, the method further comprises the step of jet injecting the first treatment substance beneath the membrane of the egg.

In another embodiment of this aspect of the invention, the second jet injection delivery device is adjusted to deliver the second treatment substance within or adjacent the albumen, the yolk sac, embryo, allantois, or amnion.

In still another embodiment of this aspect of the invention, the first and second treatment substances are released substantially simultaneously in time.

Another aspect of the invention provides an automated in ovo jet injection apparatus, comprising a flat for holding a plurality of eggs in a substantially upright and aligned position, wherein the flat is configured to provide external access to predetermined areas of the eggs, a plurality of jet injection delivery devices configured to contact predetermined areas of the egg, at least one of the jet injection devices corresponding to each egg in the flat, a first treatment substance container for holding a first treatment substance, said first container in fluid communication with each of the jet injection delivery devices.

In one embodiment of this aspect of the invention, the automatic jet injection device further comprises a means of piercing the shell of an egg, said means capable of being positioned at a predetermined position on the surface of an egg In another embodiment of this aspect of the invention, the automatic jet injection device further comprises a second treatment substance container for holding a second treatment substance, said second container in fluid communication with each of the jet injection delivery devices.

In the various embodiments of this aspect of the invention, each jet injection delivery device has a means of introducing an opening in an egg, said opening being positioned relative to a jet injection delivery device whereby the jet injection delivery device can direct a jet injection stream through the opening and into the egg.

In one embodiment of the automated in ovo jet injection apparatus according to the invention, the means of introducing an opening in an egg is a tubular punch.

In yet another embodiment of the automated in ovo jet injection apparatus according to the invention, the means of introducing an opening in an egg is a twist drill.

In still another embodiment of the invention, the means of introducing an opening in an egg is a tubular drill bit having a lumen therein.

In this embodiment of the invention, the means of introducing an opening in an egg can be configured such that the jet injection stream is delivered to the egg through the lumen of the tubular drill bit.

In various embodiments of the automated in ovo jet injection apparatus according to the invention, the means of introducing an opening in an egg can be a high-pressure gas jet that may also further comprise an abrasive for grinding an opening into the egg shell. In one embodiment, the high pressure gas jet further comprises a lubricant, a disinfectant or a combination thereof.

The automated in ovo jet injection apparatus according to the invention may further comprise a means for removing ground egg shell from the surface of the egg.

In another embodiment of the automated jet injection apparatus according to the invention, the jet injection devices are configured to deliver the first and second treatment substances via at least one of spatially and temporally sequentially separated injections into the eggs in the flat.

In another embodiment of the automated jet injection apparatus according to the invention, the at least one jet injection device corresponding to each egg includes first and second jet injection devices corresponding to each egg in the flat.

In still another embodiment of the apparatus according to the invention, the first injection device is configured to inject the top large end of the egg and the second jet injection device is configured to inject into a separate opening spaced apart from the first jet injection device. In yet another embodiment of the apparatus according to the invention, a first treatment substance stream is delivered by the first jet injection device to a depth that is below the air cell of the egg.

In one embodiment of the apparatus according to the invention, a second treatment substance stream can be delivered by the second jet injection device so as to terminate penetration into the egg above the air cell of the egg.

The invention further provides an automated in ovo jet injection apparatus, comprising a flat for holding a plurality of eggs in an aligned position, wherein the flat is configured to provide external access to predetermined areas of the eggs, a plurality of first jet injection delivery devices, wherein each jet injection delivery device is configured to direct a treatment substance stream to an egg, one of the first injection delivery devices corresponding to each egg in the flat, a plurality of second jet injection delivery devices configured to contact predetermined areas of the egg, one of the second jet injection delivery devices corresponding to each egg in the flat, a first treatment substance container for holding a first treatment substance, the first container in fluid communication with each of the first jet injection delivery devices, a second treatment substance container for holding a second treatment substance, the second container in fluid communication with each of the second injection delivery devices, a pump means operably associated with the first and second containers for delivering a predetermined dosage of each of the first and second treatment substances to each of the respective first and second jet injection devices, and a means of introducing at least one opening in each egg, wherein each opening is positioned relative to a jet injection delivery device whereby the jet injection delivery device can direct a jet injection stream comprising a treatment substance through the opening and into the egg.

In one embodiment of the automated in ovo jet injection apparatus according to this aspect of the invention, the means of opening an egg is integral to the jet injection delivery device.

In another embodiment, the first container and each of the first jet injection delivery devices define a first fluid pathway therebetween and the second container and each of the second jet injection delivery devices define a second fluid pathway therebetween, wherein the first pathway is separate from the second pathway but may be combined before exiting the orifice of the jet injection delivery device.

In another embodiment of the automated in ovo jet injection apparatus according to the invention, a first jet injection device is configured to deliver a first treatment substance at a first location below the air cell of the egg and said second jet injection device is configured to deliver a second treatment substance at a second location in the egg.

Yet another embodiment according to the invention further comprises a third treatment container for holding a third treatment substance, said third treatment communication with one of said first and second injection devices.

In this embodiment of the automated in ovo jet injection apparatus, the first injection device can also be configured to deliver said first and third treatment substances.

The present invention provides an automated in ovo injection apparatus comprising a flat for holding a plurality of eggs in an aligned position, wherein said flat is configured to provide external access to predetermined areas of the eggs, a plurality of injection delivery devices, at least one of said injection delivery devices corresponding to each egg in said flat, each of said devices having an end configured to contact and penetrate into a predetermined location in said egg, a first treatment substance container for holding a first treatment substance, said first container in fluid communication with each of said injection delivery devices, a second treatment substance container for holding a second treatment substance, said second container in fluid communication with each of said injection delivery devices, and a pump operably associated with said first and second containers for delivering a predetermined dosage of each of said first and second treatment substances to each of said injection devices, wherein the predetermined dosages of the first and second treatment substances are combined prior to said end port to be delivered to the egg together at the site of injection.

One embodiment of this automated jet injection apparatus can further comprise a means for combining the first and second treatment substances prior to injection and delivering the predetermined dosage as a mixed treatment substance along a single fluid pathway into each of said injection devices.

In another embodiment of this automated jet injection apparatus according to the invention, the first container and each of the injection devices defining a first fluid pathway therebetween and the second container and each of the injection devices defining a second fluid pathway therebetween, wherein the first and second pathways are separate but are configured to terminate to a common pathway at the first end of the jet injection device at the site of injection.

Still another embodiment of the automated injection apparatus according to the invention further comprises a third container for holding a cleansing liquid, said third container in fluid communication with said pump, said first container, and each of said injection devices, thereby allowing said fluid pathways to be flushed with said cleansing liquid.

It will be understood that although the form of the invention shown and described herein constitutes preferred embodiments of the invention, it is not intended to illustrate all possible forms of the invention. The words used are words of description rather than of limitation. Various changes and variations may be made to the present invention without departing from the spirit and scope of the invention.

EXAMPLE 1

Jet Injection into Eggs

Eighteen-day old chick embryos in the shell were inoculated with a Biojector 2000 jet injector fitted with a No. 2 syringe head and adjusted to deliver 0.2 ml of liquid. The top of an egg (four replicates were performed) was opened by picking away the shell to expose the underlying membrane and 0.2 ml of dye was delivered to the embryo. The dye was deposited both subcutaneously and intra-muscularly through the membrane as well as some dye remaining on the membrane surface. Various regions or organs of the embryos received the dye solution. The inoculations were repeated with a Biojector 3400 and No. 2 syringe with similar results.

A Biojector and No. 7 syringe as the inoculation device, in one instance, passed the indicator dye through the membrane and yolk, depositing the dye at the bottom of the egg.

EXAMPLE 2

Effect of In Ovo Jet Injection on Viability of 17-19 Day in-Shell Chicken Embryos Viable chicken in shell embryos were jet injected using a VITAJE™ (Bioject Medical Technologies, New Jersey) spring activated injector using different spring loadings and nozzle diameters for comparative purposes, according to the manufacturer's instructions. Fifty 17, 18 and 19 day embryonation eggs (ED) were used per test sample. A pilot hole was made in the shell of each egg with a drill and the exit nozzle of the injector aligned to allow an inoculum stream to enter the egg. A non-lethal tracking dye was used. The injector was fitted with an 0.006 or 0.008 nozzle and discharged with a spring force of 40 lbs or 52 lbs.

As shown in Table 1, viability to hatching was at least 70% with a 0.006 nozzle and 40 lbs spring force with an injected volume of 0.05 ml of dye, which entered directly into the tissues of the embryo chicks as determined by subsequent visual observation and dissection

TABLE 1

Effects of jet injection and age of embryo on hatchability

| Effects of jet injection and age of embryo on hatchability | Hatch | Trauma Death | Death |
|---|---|---|---|
| Control | 49/50 (98%) | 0 | 1 |
| Day 17 | 36/50 (72%) | 6 | 6 |
| Day 18 | 39/50 (78%) | 3 | 5 |
| Day 19 | 48/50 (96%) | 0 | 1 |

In another comparative study, as shown in Table 2, there was no difference between the 0.006 and the 0.008 nozzles on the viability of the recipient chicks. The volume of the delivered fluid also did not have detectable effects

TABLE 2

Effect on hatchability following jet injection in ovo (ED18) injection (52 Lbs injector)

| Nozzle Type | Volume | Hatch | Trauma Death | Death |
|---|---|---|---|---|
| 0.006 | 0.05 ml | 12/20 (60%) | 5 | 1 |
| 0.006 | 0.1 ml | 12/20 (60%) | 4 | 1 |
| 0.008 | 0.05 ml | 12/20 (60%) | 6 | 0 |
| 0.008 | 0.1 ml | 10/20 (50%) | 8 | 0 |
| Control | N/A | 20/20 (100%) | 0 | 0 |

An increase in the force of the jet stream had a detectable decrease in chick viability, as shown in Table 3.

TABLE 3

Effect on hatchability following jet injection in ovo (ED18) injection with an 0.006 nozzle and increasing jet stream forces

| Injector | Volume | Hatch | Trauma Death | Death |
|---|---|---|---|---|
| 40 lbs | 0.1 ml | 46/60 (77%) | 8 | 5 |
| 40 lbs | 0.05 ml | 44/60 (73%) | 12 | 2 |
| 52 lbs | 0.05 ml | 18/30 (60%) | 8 | 0 |

EXAMPLE 3

Use of Jet Injection to Deposit Vaccine into Viable Chick En Embryos and Elicit a Protective Immune Response Viable chicken in shell embryos were jet injected using a VITA-JECT™ spring activated injector using different spring loadings and nozzle diameters for comparative purposes. Fifty eggs of 18 days embryonation (ED) were used per test sample. A pilot hole was made in the shell of each egg with a drill and the exit nozzle of the injector was aligned to allow an inoculum stream to enter the egg. The injector was fitted with an 0.006 size nozzle and discharged with a spring force of 40 lbs. HVT vaccine directed against Marek's disease, was deposited intraembryonically, either intramuscularly or subcutaneously. Embryos were subsequently challenged by the virus to determine the efficacy of the early protection afforded by the jet injected vaccine. A high level of viability of the injected embryos was retained, as shown in Table 4.

TABLE 4

Effect of in ovo (ED18) jet injection HVT vaccination on hatchability

| Group | Hatch | Trauma Death | Death |
|---|---|---|---|
| jet injection | 121/140 (86%) | 11 | 3 |
| Control | 74/75 (99%) | 0 | 0 |

The injection of HVT vaccine directly into the 18 day chicken embryos afforded protection from a subsequent challenge with HVT, as shown in Table 5.

TABLE 5

Protective Efficacy of HVT administered via jet injection in ovo (ED 18)

| Group | Viremia on day 4 | Viremia on Day 8 | MDV/ Total | % Protection |
|---|---|---|---|---|
| Non Vaccinated- non Challenge | N/A | N/A | 0/15 | — |
| NonVaccinated- Challenge | N/A | N/A | 30/30 | 0 |
| jet injection | 19.4 ± 11 | 27.9 ± 26 | 13/59 | 78 |

Chicken embryos were also additionally treated with jet injected vaccines directed against Newcastle Disease Virus (NDV), including the vaccine encoded in the poxvirus vector Trovac. Viability of the injected embryos was not significantly affected, as shown in Table 6. The survival and response of chicks to the injected vaccine are shown in Table 7.

TABLE 6

Effect of in ovo (ED18) jet injection vaccination on hatchability (40 lbs 0.006 nozzle)

| Group | Route | Hatch | Trauma Death | Death |
|---|---|---|---|---|
| Control | N/A | 27/30 (90%) | 1 | 1 |
| Trovac ND | jet injection | 56/60 (93%) | 3 | 1 |
| NDV-WOW | jet injection | 55/60 (92%) | 1 | 2 |
| Trovac ND | SQ | 43/45 (96%) | 0 | 0 |
| WOW | SQ | 43/45 (96%) | 0 | 2 |

TABLE 7

Effect of in ovo (ED18) jet injection vaccination on chick survivability and NDV responses

| Group | Route | Death/Total | NDV Response 1st Vaccination | NDV Response 2nd Vaccination | Percentage protection |
|---|---|---|---|---|---|
| Control | N/A | 0/20 | 0/20 | 0/10 | 0 |
| Trovac ND | jet injection | 27/30 | ND | ND | NA |
| NDV-WOW | jet injection | 0/30 | 1/26 (1) | 6/13 (31) | 8 |
| Trovac ND | SQ | 0/30 | 13/30 (20) | 14/14 (3408) | 100 |
| WOW | SQ | 0/30 | 29/30 (1286) | 15/15 (3745) | 100 |

Chicken embryos were also additionally treated with jet injected with Canarypox Virus. Viability of the injected embryos was not significantly affected, as shown in Table 8. The virus recovery levels from muscle, as opposed to spleen and liver of chicks are shown in Table 9.

TABLE 8

Effect of in ovo (ED18) jet injection vaccination on hatchability (40 lbs 0.006 nozzle) following vaccination with Canarypox

| Group | Route | Hatch | Trauma/Death | Death |
|---|---|---|---|---|
| Control (PBS) | jet injection | 18/20 (90%) | 1 | 0 |
| ALVAC-CDV ($10^3$) | jet injection | 22/30 (73%) | 4 | 0 |
| ALVAC-CDV ($10^6$) | jet injection | 28/30 (93%) | 2 | 0 |
| ALVAC-CDV ($10^6$) | jet injection | 27/30 (90%) | 2 | 0 |
| ALVAC-CDV ($10^6$) | 1-Day IM | 27/30 (90%) | 0 | 2 |

TABLE 9

Effect of in ovo (ED18) jet injection vaccination on virus recovery following vaccination with Canarypox

| | | Virus Isolation | |
|---|---|---|---|
| Group | Route | Spleen/Liver | Muscle |
| Control (PBS) | jet injection | ND | ND |
| ALVAC-CDV ($10^3$) | jet injection | 0/5 | 5/5 |
| ALVAC-CDV ($10^6$) | jet injection | 0/5 | 5/5 |
| ALVAC-CDV ($10^6$) | jet injection | 0/5 | 1/5 |
| ALVAC-CDV ($10^6$) | 1-Day IM | ND | ND |

EXAMPLE 3

Preparation of a Viral Vaccine (a) Culture of the Viruses: Viruses are cultured on the appropriate cellular system until a cytopathic effect is obtained. The cellular systems to be used for each virus are well known to persons skilled in the art. Briefly, the cells sensitive to the virus used, which are cultured in Eagle's minimum essential medium (MEM medium) or another appropriate medium, are inoculated with the viral strain studied using a multiplicity of infection of 1. The infected cells are then incubated at 37° C. for the time necessary for the appearance of a complete cytopathic effect (on average 36 hours).

After culturing, the supernatant and the lysed cells are harvested and the entire viral suspension is centrifuged at 1000 g for 10 minutes at +4° C. to remove cellular debris. The viral particles are then harvested by ultracentrifugation at 400,000 g for 1 hour at +4° C. The pellet is taken up in a minimum volume of buffer (10 mM Tris, 1 mM EDTA) and the concentrated viral suspension is treated with proteinase K (100 µg/ml final) in the presence of sodium dodecyl sulphate (SDS) (0.5% final) for 2 hours at 37° C. The viral DNA is then extracted with a phenol/chloroform mixture and then precipitated with 2 volumes of absolute ethanol. After leaving overnight at −20° C., the DNA is centrifuged at 10,000 g for 15 minutes at +4° C. The DNA pellet is dried and then taken up in a minimum volume of sterile ultrapure water. It can then be digested with restriction enzymes.

The RNA viruses were purified according to techniques well known to persons skilled in the art. The genomic viral RNA of each virus is then isolated using the "guanidium thiocyanate/phenolchloroform" extraction technique described by Chromczynski & Sacchi (Anal. Biochem., 1987. 162, 156-159).

All the constructions of plasmids are carried out using the standard molecular biology techniques described by J. Sambrook et al. (Molecular Cloning: A Laboratoxy Manual, 2nd Edition, Cold Spring Harbor Laboratory, Cold Spring Harbor, N.Y., 1989). All the restriction fragments used for the present invention were isolated using the "Geneclean" kit (BIO 101 Inc. La Jolla, Calif.).

Specific oligonucleotides (comprising restriction sites at their 5' ends to facilitate the cloning of the amplified fragments) are synthesized such that they completely cover the coding regions of the genes which are to be amplified (see specific examples). The reverse transcription (RT) reaction and the polymerase chain reaction (PCR) were carried out according to standard techniques (Sambrook J. et al., 1989). Each RT-PCR reaction is performed with a pair of specific amplimers and taking, as template, the viral genomic RNA extracted. The complementary DNA amplified is extracted with phenol/chloroform/isoamyl alcohol (25:24:1) before being digested with restriction enzymes.

(b) Preparation and Purification of the Plasmids: For the preparation of the plasmids intended for the vaccination of avian eggs, any technique may be used which makes it possible to obtain a suspension of purified plasmids predominantly in the supercoiled form. These techniques are well known to persons skilled in the art. There may be mentioned in particular the alkaline lysis technique followed by two successive ultracentrifugations on a caesium chloride gradient in the presence of ethidium bromide as described in J. Sambrook et al. (Molecular Cloning: A Laboratory Manual, 2nd edition, Cold Spring Harbor Laboratory, Cold Spring Harbor, N.Y., 1989). Reference may also be made to patent applications PCT WO 95/21250 and PCT WO 96/02658 that describe methods for producing, on an industrial scale, plasmids which can be used for vaccination. For the purposes of the manufacture of vaccines, the purified plasmids are resuspended so as to obtain solutions at a high concentration (>2 mg/ml) compatible with storage. The plasmids are resuspended either in ultrapure water or in TE buffer (10 mM Tris-HCl; 1 mM EDTA, pH 8.0).

(c) Manufacture of the Associated Vaccines: The various plasmids necessary for the manufacture of an associated vaccine are mixed starting with their concentrated solutions. The mixtures are prepared such that the final concentration of each plasmid corresponds to the effective dose of each plasmid. The solutions that can be used to adjust the final concentration of the vaccine may be either a 0.9% NaCl solution, or PBS buffer. Specific formulations such as liposomes, cationic lipids, may also be used for the manufacture of the vaccines.

PROPHETIC EXAMPLE

Antibody Generation Conferring a Protective Response to Infection in Chickens

Chicken embryos are treated with jet injected DNA vaccines directed against Newcastle Disease Virus (NDV), including a vaccine encoded in the poxvirus vector Trovac.

Viability of the injected embryos is not significantly affected. The embryos are jet injected with between about 50 µg and 1000 µg of a DNA construct comprising a plasmid or viral vector incorporating a promoter, preferably, but not limited to, an avian gene promoter that will drive expression of a heterologous nucleic acid operably linked thereto, the heterologous nucleic acid encoding at least one antigenic determinant of an avian pathogen. The nucleic acid vaccine preparation, which is optionally mixed with a pharmaceutically acceptable carrier will be jet injected directly into the breast muscle tissue of shelled embryos using the apparatus and methods described herein.

After resealing of the injected eggshells using glue of other suitable sealing method that maintains the sterility of the internal contents of the eggs, the eggs are incubated until hatching of the chicks. Expression of the antigenic target in the serum of the chicks and adult birds will be measured. Antibody generation in the serum is measured at least up to 60 days from hatching of the injected chicks. Detectable levels of the expected antibody will be found, the levels correlating to the degree of protection afforded against the target infectious organism presented to the treated birds.

Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed:

1. A jet injection method for treating an avian embryo in ovo, comprising the steps of:
    (a) orienting an avian egg into a predetermined position;
    (b) introducing a first opening into the shell of said egg;
    (c) positioning a jet injection delivery device relative and external to the first opening wherein the jet injection delivery device directs a jet injection stream through the first opening and into the egg without passing through the first opening in the egg shell into the interior of the egg;
    (d) releasing a predetermined dosage of a first treatment substance by jet injection into the egg; and
    (e) retracting the jet injection delivery device, thereby treating the avian embryo.

2. The method according to claim 1, further comprising the steps of introducing a second opening into the egg shell separate from the first opening and externally positioning a jet injection delivery device to direct a jet injection stream through the second small opening and into the egg without the jet delivery device passing through the second opening in the egg shell into the interior of the egg, thereby delivering a predetermined dosage of a second treatment substance by jet injection into the egg.

3. The method according to claim 2, wherein the first and second treatment substances are jet injected into different compartments of the egg.

4. The method according to claim 2, wherein at least one treatment substance is jet injected into the air cell and another treatment substance is introduced via the jet injection device into the yolk sac, allantois, amnion or embryo.

5. The method according to claim 1, wherein the opening is introduced by piercing the shell with a device selected from the group consisting of a tubular drill, a twist drill, a grinding drill bit, a tubular punch having a lumen coaxial with a high pressure stream from the jet injection device, wherein the jet injection stream is delivered through the lumen of the tubular punch, a gas stream, a gas stream comprising an abrasive, a gas stream comprising a liquid lubricant, and a gas stream comprising a disinfectant.

6. The method according to claim 1, further comprising the step of resealing the egg shell.

7. The method according to claim 6, wherein the step of resealing the egg shell comprises applying to a hole in the egg shell a glue seal, a sealing membrane or a combination thereof.

8. A jet injection method for treating avian embryos in ovo, comprising the steps of:
    orienting an avian egg into a predetermined position;
    positioning a shell piercing means to a predetermined position on the shell surface;
    piercing the shell of the avian egg;
    positioning a jet injection delivery device relative and external to the opening, wherein the jet injection delivery device directs a jet injection stream through the opening and into the egg without passing through the opening in the egg shell into the interior of the egg;
    retracting the jet injection delivery devices, thereby treating the avian embryo; and
    resealing the egg.

9. A jet injection method for treating avian embryos in ovo, comprising the steps of:
    orienting an avian egg into a predetermined position;
    positioning a shell piercing means to a predetermined position on the shell surface;
    introducing a first opening into the shell of an avian egg;
    introducing a second opening into the shell of an avian egg, the second opening being spaced apart from the first opening;
    positioning a first jet injection delivery device relative and external to the first opening wherein the jet injection delivery device directs a first jet injection stream through the first opening and into the egg without passing through the first opening in the egg shell into the interior of the egg;
    positioning a second jet injection delivery device relative and external to the second opening wherein the jet injection delivery device directs a second jet injection stream through the second opening and into the egg without passing through the second opening in the egg shell into the interior of the egg;
    releasing a predetermined dosage of a first treatment substance from the first jet injection delivery device into the egg;
    releasing a predetermined dosage of a second treatment substance from the second delivery device into the egg;
    retracting the first and second jet injection delivery devices from the egg, thereby treating the avian embryo; and resealing the egg shell.

10. A jet injection method for inducing a protective response to an infectious agent in an avian, comprising the steps of:
    orienting an avian egg into a predetermined position;
    positioning a shell piercing means to a predetermined position on the shell surface;
    piercing the shell of the avian egg;
    positioning a jet injection delivery device relative and external to the opening, wherein the jet injection delivery device directs a jet injection stream through the opening and into the egg without passing through the opening in the egg shell into the interior of the egg, and wherein the jet injection stream comprises a pharmaceutical substance capable of inducing a protective response in an avian against an infectious agent;

jet injecting the pharmaceutical substance into the egg, thereby treating the avian embryo therein;

retracting the jet injection delivery devices;

resealing the egg; and incubating the treated egg, thereby allowing a protective response to develop.

11. The method according to claim 10, wherein the pharmaceutical substance is an antigen or a DNA vaccine capable of elicting an immune response in a bird.

12. The method according to claim 10, wherein the pharmaceutical substance is jet injected into the breast muscle of a bird.

13. The method according to claim 11, wherein the DNA vaccine elicits a protective response against Marek's disease, IBDV, Infectious Bursal disease, coccidial infection, Newcastle Disease virus or ILT.

14. An automated in ovo jet injection apparatus, comprising:

a flat for holding a plurality of eggs in a substantially upright and aligned position, wherein the flat is configured to provide external access to predetermined areas of the eggs;

a plurality of jet injection delivery devices configured to contact predetermined areas of the egg, at least one of the jet injection devices corresponding to each egg in the flat, wherein the plurality of jet delivery devices do not enter into the interior of the eggs;

a first treatment substance container for holding a first treatment substance, said first container in fluid communication with each of the jet injection delivery devices and, optionally, a second treatment substance container for holding a second treatment substance, said second container in fluid communication with each of the jet injection delivery devices and wherein each jet injection delivery device has a means of introducing an opening in an egg, said opening being positioned relative to a jet injection delivery device wherein the jet injection delivery device directs a jet injection stream through the opening and into the egg without passing through the opening in the egg.

15. The automatic jet injection device according to claim 14, wherein the means of introducing an opening in an egg is a tubular punch, a twist drill, a tubular drill bit having a lumen therein, or a high-pressure gas jet.

16. The automatic jet injection device according to claim 15, wherein the tubular punch is coaxial to the jet injection stream delivered by the jet injection delivery device.

17. The automatic jet injection device according to claim 15, wherein the high pressure gas jet further comprises an abrasive for grinding an opening into the egg shell, a lubricant, a disinfectant or any combination thereof.

18. The automatic jet injection device according to claim 14, further comprising a means for removing ground egg shell from the surface of the egg.

19. The automated jet injection apparatus according to claim 15, wherein the at least one jet injection device corresponding to each egg includes first and second jet injection devices corresponding to each egg in the flat.

20. The automated jet injection apparatus according to claim 19, wherein the first injection device is configured to inject the top large end of the egg and the second jet injection device is configured to inject into a separate opening spaced apart from the first jet injection device.

21. An automated in ovo jet injection apparatus, comprising:

a flat for holding a plurality of eggs in an aligned position, wherein the flat is configured to provide external access to predetermined areas of the eggs;

a plurality of first jet injection delivery devices, wherein each jet injection delivery device is configured to externally direct a treatment substance stream into an egg without passing into the egg, one of the first injection delivery devices corresponding to each egg in the flat;

a plurality of second jet injection delivery devices configured to contact predetermined areas of the egg without passing into the egg, one of the second jet injection delivery devices corresponding to each egg in the flat;

a first treatment substance container for holding a first treatment substance, the first container in fluid communication with each of the first jet injection delivery devices;

a second treatment substance container for holding a second treatment substance, the second container in fluid communication with each of the second injection delivery devices;

a pump means operably associated with the first and second containers for delivering a predetermined dosage of each of the first and second treatment substances to each of the respective first and second jet injection devices; and a means of introducing at least one opening in each egg, wherein each opening is positioned relative to a jet injection delivery device whereby the jet injection delivery device can direct a jet injection stream comprising a treatment substance through the opening and into the egg.

22. The automated in ovo jet injection apparatus according to claim 21, wherein the means of opening an egg is integral to the jet injection delivery device.

23. The automated in ovo jet injection apparatus according to claim 21, the first container and each of the first jet injection delivery devices define a first fluid pathway therebetween and the second container and each of the second jet injection delivery devices define a second fluid pathway therebetween, wherein the first pathway is separate from the second pathway.

24. The automated jet injection apparatus according to claim 21, wherein said first jet injection device is configured to deliver a first treatment substance at a first location below the air cell of the egg and said second jet injection device is configured to deliver a second treatment substance at a second location in the egg.

25. An automated in ovo jet injection apparatus, comprising:

a flat for holding a plurality of eggs in an aligned position, wherein said flat is configured to provide external access to predetermined areas of the eggs;

a plurality of injection delivery devices, at least one of said injection delivery devices corresponding to each egg in said flat, each of said devices having opposing first and second end portions, said second end portion having an end port configured to externally direct a treatment substance stream into a predetermined location in said egg without passing into the egg;

a first treatment substance container for holding a first treatment substance, said first container in fluid communication with each of said injection delivery devices;

a second treatment substance container for holding a second treatment substance, said second container in fluid communication with each of said injection delivery devices;

a pump operably associated with said first and second containers for delivering a predetermined dosage of each of said first and second treatment substances to each of said injection devices, wherein the predetermined dosages of the first and second treatment substances are combined prior to said end port to be delivered to the egg together at the site of injection and further comprising a means for piercing the shell of the egg, said means capable of being positioned at the predetermined location on the surface of the egg.

26. The automated jet injection apparatus according to claim 25, further comprising a mixing chamber in fluid communication with said first and second containers and said injection devices, said mixing chamber positioned intermediate of said containers and said injection devices, thereby temporally combining the first and second treatment substances prior to injection and delivering the predetermined dosage as a mixed treatment substance along a single fluid pathway into each of said injection devices.

27. The automated jet injection apparatus according to claim 25, the first container and each of the injection devices defining a first fluid pathway therebetween and the second container and each of the injection devices defining a second fluid pathway therebetween, wherein the first and second pathways are separate but are configured to terminate to a common pathway at the first end of the jet injection device at the site of injection.

28. The automated jet injection apparatus according to claim 26, further comprising a third container for holding a cleansing liquid, said third container in fluid communication with said pump, said first container, and each of said injection devices, thereby allowing said fluid pathways to be flushed with said cleansing liquid.

* * * * *

UNITED STATES PATENT AND TRADEMARK OFFICE
CERTIFICATE OF CORRECTION

| | | |
|---|---|---|
| PATENT NO. | : 7,261,053 B2 | Page 1 of 1 |
| APPLICATION NO. | : 11/096639 | |
| DATED | : August 28, 2007 | |
| INVENTOR(S) | : Kemal Karaca et al. | |

It is certified that error appears in the above-identified patent and that said Letters Patent is hereby corrected as shown below:

On the Title of the patent, the drawing on the right side, "Fluid Supply" should read --High Pressure Gas-- and "High Pressure Gas" should read --Fluid Supply--.

In the drawings, Sheet 6, Fig. 3G, "Fluid Supply" should read --High Pressure Gas-- and "High Pressure Gas" should read --Fluid Supply--.

Column 10, line 39, "FIG. 3G" should read --FIG. 3H--.

Signed and Sealed this

Sixth Day of May, 2008

JON W. DUDAS
*Director of the United States Patent and Trademark Office*